(12) United States Patent
Yohso et al.

(10) Patent No.: US 7,360,531 B2
(45) Date of Patent: Apr. 22, 2008

(54) COMBUSTION CHAMBER STRUCTURE FOR SPARK-IGNITION ENGINE

(75) Inventors: Takashi Yohso, Fucho-cho (JP); Masahisa Yamakawa, Fucho-cho (JP); Kouji Shishime, Fucho-cho (JP); Toshiaki Nishimoto, Fucho-cho (JP)

(73) Assignee: OKI Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 11/520,700

(22) Filed: Sep. 14, 2006

(65) Prior Publication Data

US 2007/0056556 A1    Mar. 15, 2007

(30) Foreign Application Priority Data

Sep. 15, 2005    (JP) .............................. 2005-268439
Sep. 30, 2005    (JP) .............................. 2005-289264

(51) Int. Cl.
 *F02B 31/00*    (2006.01)
 *F02B 23/00*    (2006.01)
 *F02P 15/02*    (2006.01)

(52) U.S. Cl. ...................... 123/657; 123/308; 123/310; 123/661

(58) Field of Classification Search ................ 123/308, 123/310, 661, 657, 662, 663
See application file for complete search history.

(56) References Cited

U.S. PATENT DOCUMENTS 4,811,708 A * 3/1989 Gruden ....................... 123/299

FOREIGN PATENT DOCUMENTS

| | | |
|---|---|---|
| EP | 0 569 289 A1 | 11/1993 |
| EP | 0 851 102 A2 | 7/1998 |
| JP | 08-049546 | 2/1996 |
| JP | 08-254126 | 10/1996 |
| JP | 10317974 | 12/1998 |
| JP | 11 210470 A | 8/1999 |
| JP | 2003027944 | 1/2003 |
| JP | 2003-184559 | 7/2003 |

OTHER PUBLICATIONS

European Search Report Application No. EP 06 12 0647 dated Feb. 19, 2007.

* cited by examiner

*Primary Examiner*—Stephen K. Cronin
*Assistant Examiner*—Hyder Ali
(74) *Attorney, Agent, or Firm*—Donald R. Studebaker; Nixon Peabody LLP

(57) ABSTRACT

This invention relates to a combustion chamber structure for a spark-ignition engine, which comprises a combustion chamber defined between a bottom surface of a cylinder head and a top surface of a piston in such a manner that the bottom surface of the cylinder head serves as a ceiling wall thereof, and a spark plug having a sparking end protruding from the ceiling wall into the combustion chamber. In this combustion chamber structure, when the piston is at a top dead center, a principal space of the combustion chamber is comprised of a first combustion space around the sparking end of the spark plug and a second combustion space around a circumference of a cylinder bore. Further, the first combustion space and the second combustion space are communicated with each other through a small interspace zone where an interspace between the ceiling wall and the top surface of the piston is narrowed. The combustion chamber structure makes it possible to increase compression ratio in a practically effective manner.

14 Claims, 12 Drawing Sheets

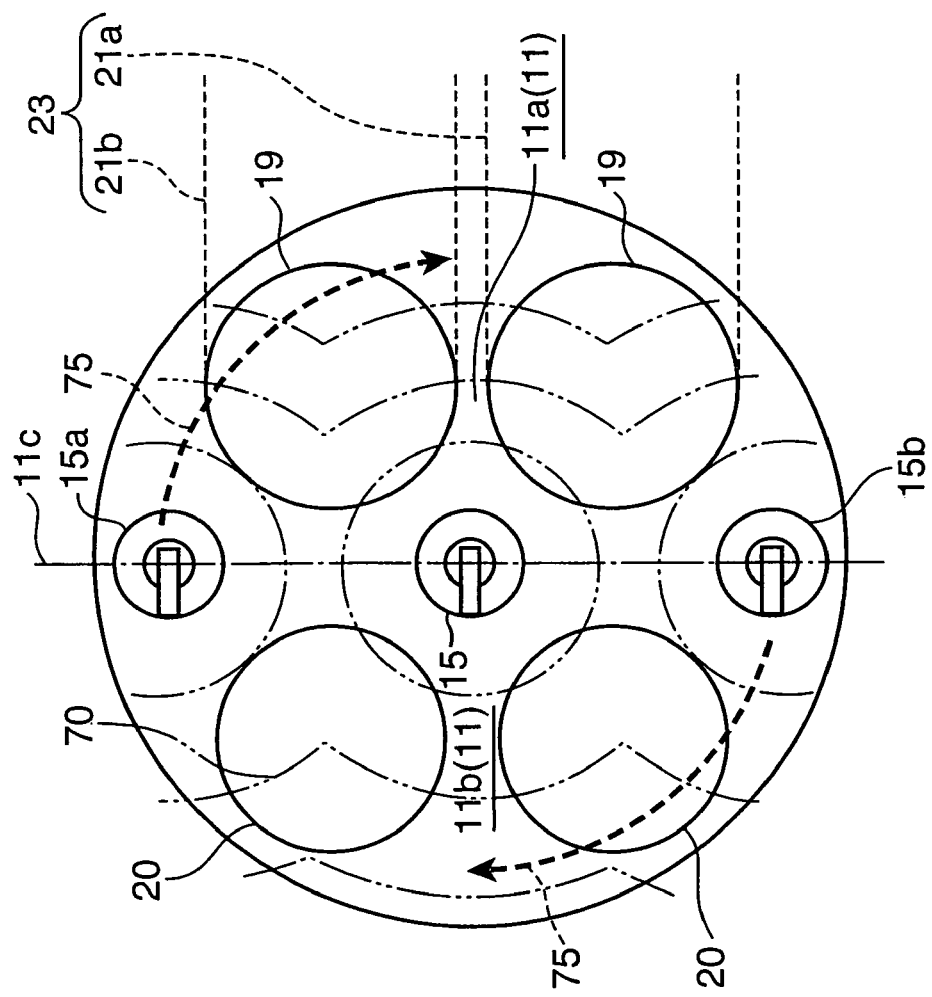
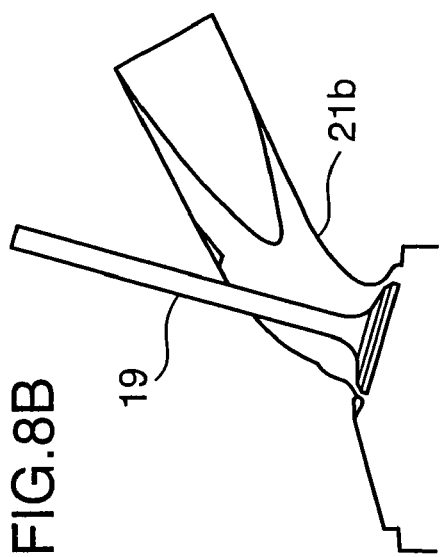
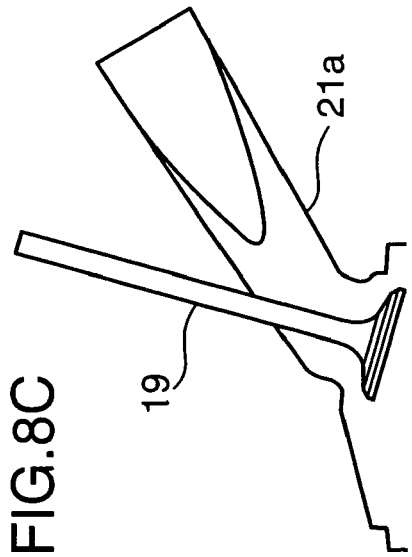
FIG.8A
FIG.8B
FIG.8C

COMBUSTION CHAMBER STRUCTURE FOR SPARK-IGNITION ENGINE

BACKGROUND OF THE INVENTION

1. Field of the Invention

The present invention relates to a combustion chamber structure for a spark-ignition engine, and more specifically to a structure for a combustion chamber defined between a bottom surface of a cylinder head and a top surface of a piston in such a manner that the bottom surface of the cylinder head serves as a ceiling wall thereof.

2. Background Art

In recent years, there has been an ever-growing need for improving engine fuel economy from not only economic aspects but also environmental aspects of measures for preventing global warming. In spark-ignition engines, the improvement in combustion efficiency is an effective approach for obtaining enhanced fuel economy, and an increase in compression ratio is one of dominant techniques therefor.

A higher compression ratio can be achieved by reducing a combustion chamber volume relative to a cylinder volume. As a combustion chamber structure suitable for providing a higher compression ratio, a pent-roof type combustion chamber structure, for example, is widely used. This type of combustion chamber structure is characterized in that a ceiling wall of a combustion chamber has an intake-side ceiling wall region and an exhaust-side ceiling wall region each formed in a roof shape, to allow a combustion chamber volume to be reduced while ensuring relatively large intake and exhaust valve diameters. In addition, this type of combustion chamber structure is advantageous in generating an in-cylinder flow, such as a swirl flow (rotational flow about a slinging axis of a piston: horizontal or transverse vortex), a tumble flow (rotational flow in a plane parallel to a sliding axis of a piston: vertical vortex) or a squish flow (flow of air or air/fuel mixture pushed out of a circumferential zone toward a central zone of a piston/cylinder bore during an upward movement of the piston).

For example, Japanese Patent Laid-Open Publication Nos. 08-254126, 08-049546 and 2003-184559 disclose combustion chamber structures for generating various types of in-cylinder flows to provide enhanced combustion efficiency. As seen in illustrated sectional configurations thereof, all of these combustion chamber structures can be considered as the pent-roof type.

FIG. 12 shows a sectional configuration of a conventional typical pent-roof type combustion chamber structure, wherein a piston 93 is at TDC (Top Dead Center). A combustion chamber 94 is a space surrounded by a cylinder bore 12 of a cylinder block 50, a top surface 97 of the piston 93, and a ceiling wall 91 which is a bottom surface of a cylinder head 10 exposed to the combustion chamber 94. The ceiling wall 91 has an intake-side ceiling wall region 91a and an exhaust-side ceiling wall region 91b each formed in a roof shape.

A spark plug 15 is installed in the cylinder head 10 approximately at the radial center of the cylinder bore 12 in such a manner as to allow a sparking end thereof to protrude from the ceiling wall 91 into the combustion chamber 94.

The intake-side ceiling wall region 91a is formed with respective intake openings of two intake ports 21, and provided with two intake valves 19 each adapted to open a corresponding one of the intake ports 21 at a given intake timing. The exhaust-side ceiling wall region 91b is formed with respective exhaust openings of two exhaust ports 22, and provided with two exhaust valves 20 each adapted to open a corresponding one of the exhaust ports 22 at a given exhaust timing. Each of the intake valves 19 and the exhaust valves 20 has a surface exposed to the combustion chamber 94, and a part of the intake-side ceiling wall region 91a and the exhaust-side ceiling wall region 91b is comprised of the exposed surfaces.

While the intake valves 19, the exhaust valves 20, the intake ports 21 and the exhaust ports 22 are actually disposed to be offset from the illustrated sectional positions in a direction perpendicular to the drawing sheet, FIG. 12 shows them in the same sectional plane for purposes of illustration.

The ceiling wall 91 has a circumferential region 91d which is approximately flush with a matching surface of the cylinder head 10 with the cylinder block 50 (more specifically, a matching surface of the cylinder head 10 with a cylinder head gasket (not shown) interposed between the cylinder head 10 and the cylinder block 50). This circumferential region 91d of the ceiling wall 91 is generally called "squish area".

In reality, even if a higher compression ratio is achieved, for example, by ingeniously designing a combustion chamber structure as described above, such a structure cannot always ensure practically valuable combustion. The reason is that a higher compression ratio is more likely to cause abnormal combustion, such as knocking (these abnormal combustions will hereinafter be referred to generically as "Knocking"), as is well known. From a practical standpoint, this means that the compression ratio can be increased only within a range free of Knocking.

Conversely, it means that, if the occurrence of Knocking can be suppressed, i.e., an anti-Knocking performance can be improved, the compression ratio will be able to be further increased.

SUMMARY OF THE INVENTION

It is an object of the present invention to provide a combustion chamber structure for a spark-ignition engine, capable of solving the above problem.

Through various researches with a focus on a combustion mode designed to perform combustion at a low speed in an initial primary combustion period (an initial stage of a primary combustion period where a combustible mass is burnt from 10% to less than 90%, wherein the combustible mass is burnt from 10% up to less than 50% in the initial stage), so as to suppress an increase in in-cylinder pressure and temperature and effectively prevent preignition of unburnt fuel to obtain a higher anti-Knocking performance, and then burn unburnt fuel at a high speed in a final primary combustion period (a final stage of the primary combustion period, wherein the combustible mass is burnt from 50% up to less than 90% in the last stage) and rapidly complete the combustion so as to prevent self-ignition due to residual unburnt fuel to obtain a higher anti-Knocking performance, whereby Knocking can be effectively suppressed mostly without extending the primary combustion period for the entire combustion (in this specification, this combustion mode will hereinafter be refereed to as "final-stage centered combustion"), the inventors has found the following combustion chamber structure for a spark-ignition engine, capable of readily performing the final-stage centered combustion.

Specifically, according to a first aspect of the present invention, there is provided a combustion chamber structure for a spark-ignition engine, which comprises a combustion chamber defined between a bottom surface of a cylinder head and a top surface of a piston in such a manner that the bottom surface of the cylinder head serves as a ceiling wall thereof, and a spark plug having a sparking end protruding from the ceiling wall into the combustion chamber. In this combustion chamber structure, when the piston is at a top dead center, a principal space of the combustion chamber is comprised of a first combustion space around the sparking end of the spark plug and a second combustion space around a circumference of a cylinder bore. Further, the said ceiling wall (11) and the top surface (9) of said piston (13) are configured such that a narrowed space is formed therebetween so that said narrowed space functions as a small interspace zone (5) which communicates between said first combustion space (14a) and said second combustion space (14b).

BRIEF DESCRIPTION OF THE DRAWINGS

FIG. 8A is a top plan view showing an intake-side ceiling wall, viewing from the side of a piston, as an explanatory diagram of a swirl flow and a flame propagation FIG. 8B is a schematic diagram showing the configuration of a (secondary) intake port for a swirl generation intake system, in the second embodiment.

FIG. 8C is a schematic diagram showing the configuration of a (primary) intake port for the swirl generation intake system, in the second embodiment.

DETAILED DESCRIPTION OF THE PREFERRED EMBODIMENTS OF THE INVENTION

Figure 1:
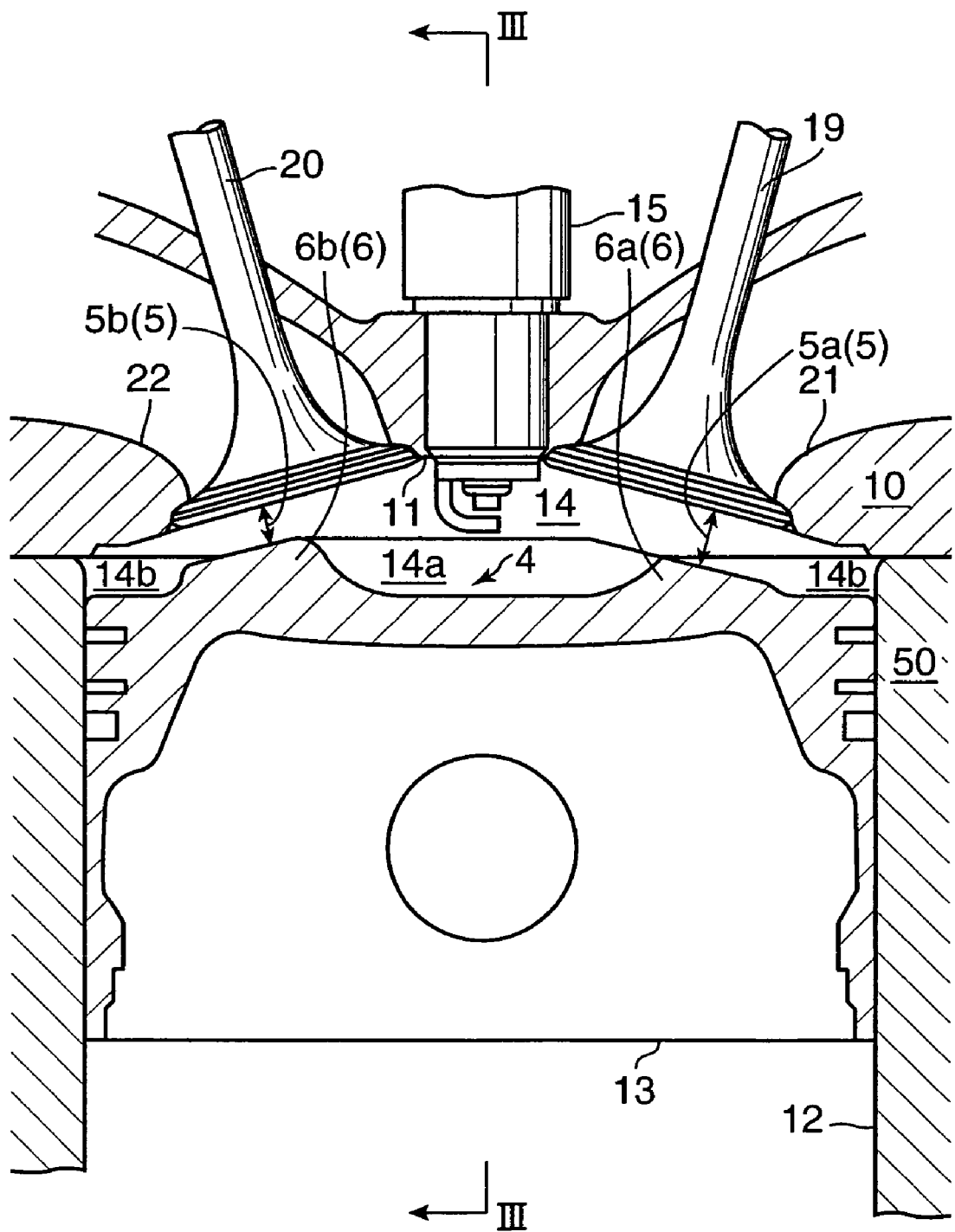
FIG. 1 is a vertical sectional view showing a combustion chamber structure for a spark-ignition engine according to a first embodiment of the present invention.
Figure 2:
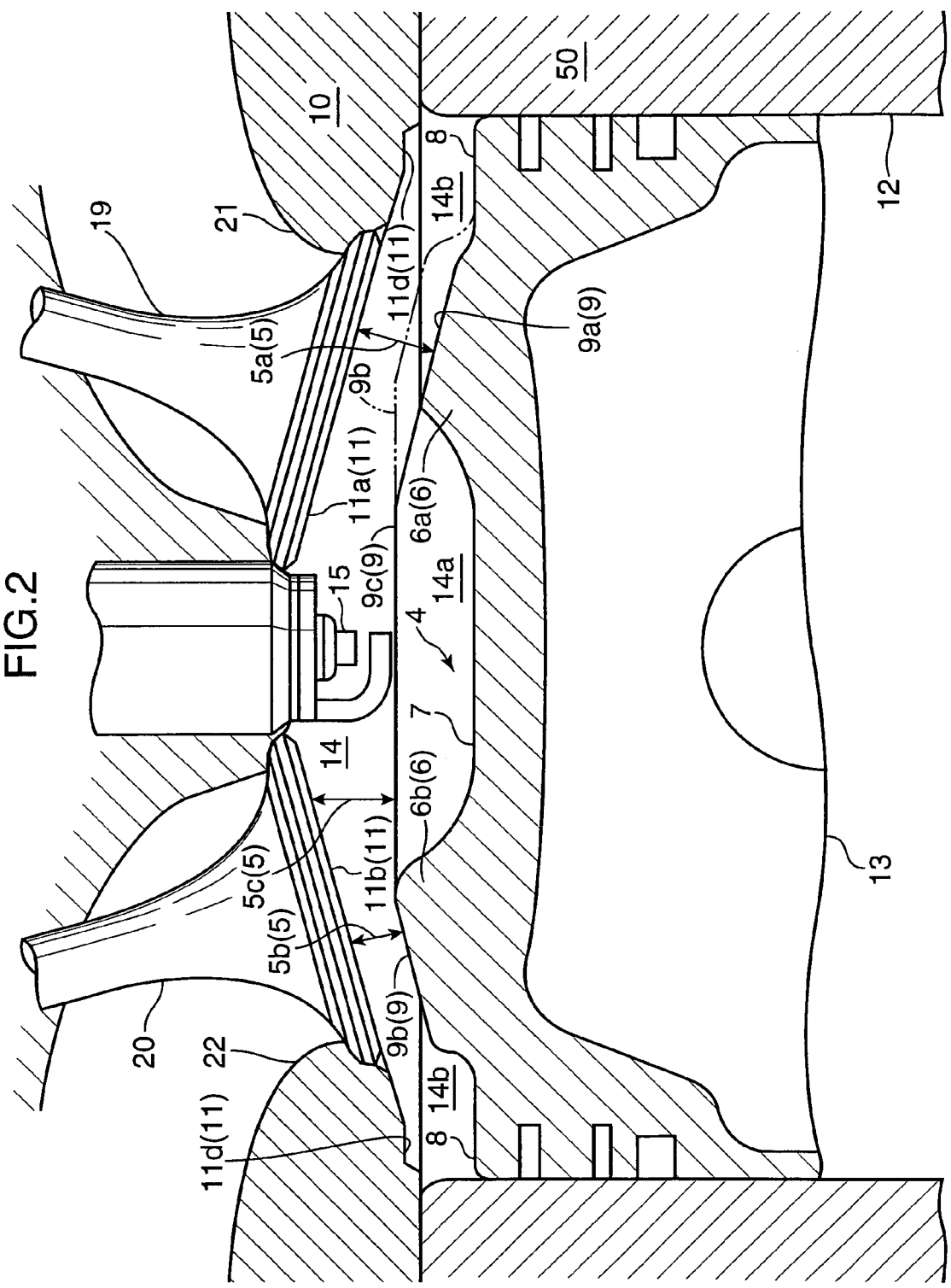
FIG. 2 is a fragmentary enlarged view of the combustion chamber structure in FIG. 1.
Figure 3:
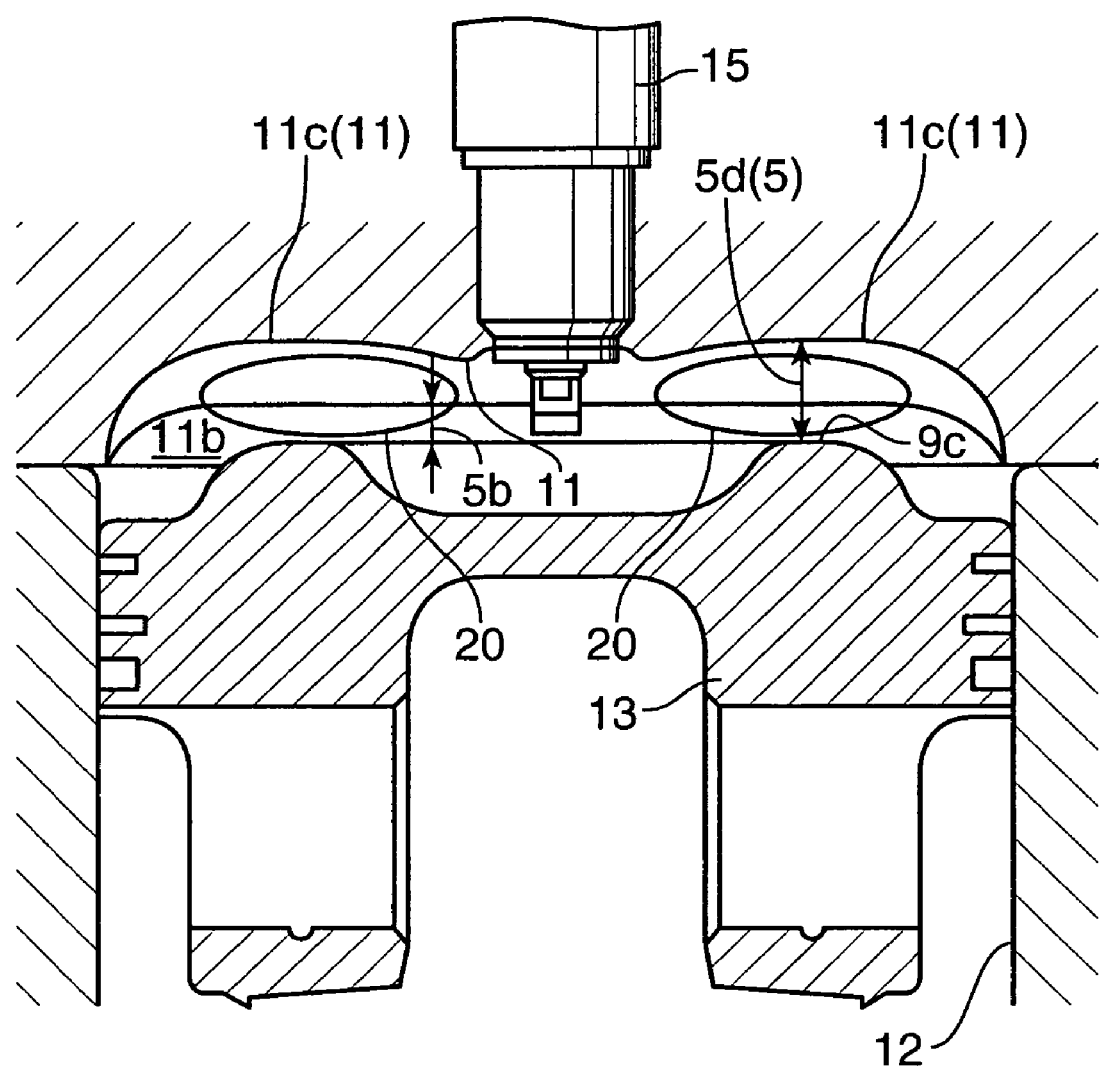
FIG. 3 is a sectional view taken along the line III-III in FIG. 1.

FIG. 1 is a vertical sectional view showing a combustion chamber structure for a spark-ignition engine according to a first embodiment of the present invention. FIG. 2 is a fragmentary enlarged view of the combustion chamber structure in FIG. 1. FIG. 3 is a sectional view taken along the line III-III in FIG. 1.

A combustion chamber 14 in the first embodiment is designed as a pent-roof type. In FIGS. 1 to 3, the combustion chamber 14 is shown under the condition that a piston 13 is at TDC (Top Dead Center). The combustion chamber 14 is a space surrounded by a cylinder bore (cylinder bore surface or wall) 12 of a cylinder block 50, a top surface 4 of the piston 13, and a ceiling wall 11 which is a bottom surface of a cylinder head 10 exposed to the combustion chamber 14). The ceiling wall 11 has an intake-side ceiling wall region 11a and an exhaust-side ceiling wall region 11b each formed in a roof shape.

A spark plug 15 is installed in the cylinder head 10 approximately at or around the radial center of the cylinder bore 12 in such a manner as to allow a sparking end thereof to protrude from the ceiling wall 11 into the combustion chamber 14.

The intake-side ceiling wall region 11a is formed with respective intake openings of two intake ports 21, and provided with two intake valves 19 each adapted to open a corresponding one of the intake ports 21 at a given intake timing. The exhaust-side ceiling wall region 11b is formed with respective exhaust openings of two exhaust ports 22, and provided with two exhaust valves 20 each adapted to open a corresponding one of the exhaust ports 22 at a given exhaust timing. Each of the intake valves 19 and the exhaust valves 20 has a surface exposed to the combustion chamber 14, and a part of the intake-side ceiling wall region 11a and the exhaust-side ceiling wall region 11b is comprised of the exposed surfaces.

While the intake valves 19, the exhaust valves 20, the intake ports 21 and the exhaust ports 22 illustrated in FIGS. 1 and 2 are actually disposed to be offset from the illustrated sectional positions in a direction perpendicular to the drawing sheet, FIGS. 1 and 2 show them in the same sectional plane for purposes of illustration (see FIG. 3).

As shown in FIG. 2, a circumferential region 11d of the ceiling wall 11 is formed to be offset relative to a matching surface of the cylinder head 10 with the cylinder block 50 (more specifically, a matching surface of the cylinder head 10 with a cylinder head gasket (not shown) interposed between the cylinder head 10 and the cylinder block 50), in a direction apart from the cylinder block 50.

Figure 4:
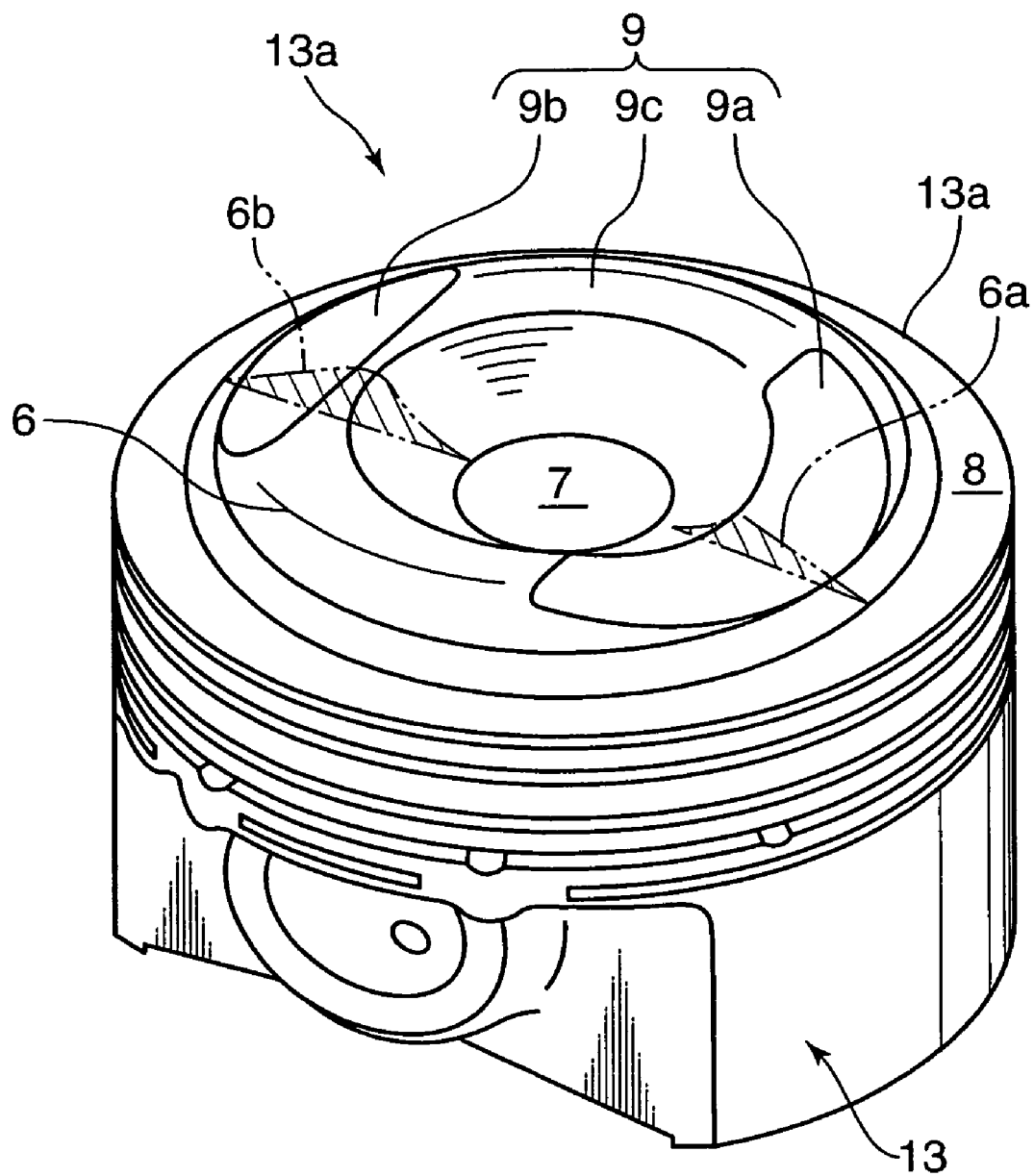
FIG. 4 is a perspective view showing a piston in FIG. 1.

When the piston 13 is at TDC, a principal space of the combustion chamber 14 is comprised of a first combustion space 14a around the sparking end of the spark plug 15 and a second combustion space 14b around a circumference of the cylinder bore 12. The first combustion space 14a and the second combustion space 14b are communicated with each other through a small clearance or interspace zone 5 where an interspace (distance or clearance) between the ceiling wall 11 and the piston top surface 4 is narrowed. The configuration of the piston 13, particularly the configuration of a crown thereof (i.e., piston crown), will be described below. FIG. 4 is a perspective view of the piston 13. The following description will be made on the assumption that a vertical (i.e., upward/downward) direction of the piston 13 corresponds to a vertical (i.e., upward/downward) direction of the piston 13 illustrated in each figure, or an upper portion of the piston 13 corresponds to a portion of the piston 13 located closer to the ceiling wall 11, in its assembled state. Note than the term "crown 13a" used in this description is meant to include a top surface of the piston 13 in general.

The piston crown 13a is formed with a convex portion 6 protruding upward and having an annular shape approximately concentric with the outer circumference of the piston 13. The piston crown 13a is also formed with a concave portion concaved relative to the convex portion 6 and located on an inward side of an inner circumference of the convex portion 6 and on an outward side of an outer circumference of the convex portion 6. Specifically, a central concave area 7 and a circumferential concave area 8 are formed, respectively, on the inward side of the inner circumference of the convex portion 6 and on the outward side of the outer circumference of the convex portion 6.

The convex portion 6 is an annular-shaped portion protruding upward and having a given height and a given width, and is comprised of an exhaust-side first convex area 6b, an intake-side second convex area 6a and a connection area connecting between the first and second convex areas 6b, 6a. Each of the first and second convex areas 6b, 6ahas a top surface with a shape formed such that a convex portion having a horizontal top surface is cut off from an inner periphery toward an outer periphery thereof, along a planar inclined plane, or obliquely downward. Surfaces corresponding to the resulting cut sections serve as a top surface 9bof the first convex area 6b and a top surface 9a of the second convex area 6a, respectively. Respective sectional shapes of the first and second convex areas 6b, 6a are represented as the hatched area in FIGS. 1 to 3.

As is clear from a comparison between respective sectional shapes of the first and second convex areas 6b, 6a, an intake-side region of the convex portion 6 is largely cut off as compared with an exhaust-side region thereof. Thus, comparing the top surface 9b of the first convex area 6b and the top surface 9a of the second convex area 6a at respective positions thereof spaced apart from each other in a horizontal direction of FIG. 2 by a constant distance, the top surface 9b of the primary or exhaust-side convex area 6b has a height greater than that of the top surface 9a of the secondary or intake-side convex area 6a.

In a top surface 9 of the convex portion 6, the remaining region other than the top surface 9a of the intake-side convex area 6a and the top surface 9b of the exhaust-side convex area 6b is formed as an approximately-horizontal and planar top surface 9c of a third convex area. The flat top surface 9c has an average radius is set to be slightly greater than one-half of an average radius of the piston 13.

The central concave area 7 is located on the inward side of the inner circumference of the convex portion 6 and concaved relative to the convex portion 6. The central concave area 7 has a bowl-shaped wall surface consisting of a central flat region and a curved region smoothly extending from the inner circumference of the convex portion 6 to an outer circumference of the central flat region.

The circumferential concave area 8 is located on the outward side of the outer circumference of the convex portion 6 and concaved relative to the convex portion 6. The circumferential concave area 8 has an approximately-horizontal annular shape.

With reference to FIG. 2, the configuration of the combustion chamber 14 will be more specifically described below. The first combustion area 14a is defined between the central concave area 7 and the ceiling wall 11 of the piston 13. The second combustion area 14b is annularly defined between the circumferential concave area 8 and the ceiling wall 11 (specifically, the circumferential region 11d of the ceiling wall 11).

The small interspace zone 5 communicating between the first combustion area 14a and the second combustion area 14b is annularly defined between the ceiling wall 11 and the top surface 9 of the convex portion 6. As mentioned above, the average radius of the flat top surface 9c is slightly greater than one-half of the average radius of the piston 13. Thus, the small interspace zone 5 is defined in a position closer to the circumference of the cylinder bore 12 than a midpoint between the sparking end of the spark plug 15 and the circumference of the cylinder bore 12 in a radial direction of the cylinder bore 12. While an optimal position of the small interspace zone 5 is varied depending on engine characteristics, it is generally in the range of 60 to 85% of a distance between the sparking end of the spark plug 15 and the circumference of the cylinder bore 12.

More specifically, the small interspace zone 5 is comprised of a small interspace sub-zone 5a, a muumuu interspace sub-zone 5b, a small interspace sub-zone 5c and a small interspace sub-zone 5d (see FIG. 3).

The small interspace sub-zone 5a is an interspace between the top surface 9a of the intake-side convex portion 6a of the piston 9a and the ceiling wall 11 opposed to the top surface 9a. The muumuu interspace sub-zone 5b is an interspace between the top surface 9b of the exhaust-side convex portion 6b of the piston 9a and the ceiling wall 11 opposed to the top surface 9b. As mentioned above, the top surface 9b of the exhaust-side convex area 6b is located at a height greater than that of the top surface 9a of the intake-side convex area 6a (for comparison, a shape corresponding to the top surface 9b of the exhaust-side convex area 6b is indicated in the vicinity of the top surface 9a of the intake-side convex area 6a in FIG. 2 by the two-dot chain line). Thus, the minimum interspace sub-zone 5b is narrower than the small interspace sub-zone 5a. Further, the minimum interspace sub-zone 5b is narrower than each of the small interspace sub-zones 5c, 5d. That is, the minimum interspace sub-zone 5b is the smallest interspace in the mall interspace zone 5.

The small interspace sub-zone 5c is an interspace between the planer top surface 9c of the third convex area of the piston 13 and the ceiling wall 11 opposed to the top surface 9c. The interspace of the small interspace sub-zone 5c is narrowed as the ceiling wall 11 becomes lower in height, and is widened as the ceiling wall 11 becomes higher in height, i.e., toward a ridge region 11c (see FIG. 3). The small interspace sub-zone 5d is an interspace between the ridge region 11c and the planer top surface 9c of the third convex area, and this interspace is the largest value in the small interspace zone 5.

An operation of the spark-ignition engine with the combustion chamber structure according to this embodiment will be described below.

In an intake stroke, the intake valves 19 are opened, and the piston 13 is moved downward. In conjunction with the downward movement of the piston 13, an air-fuel mixture is taken into the combustion chamber 14 through the intake ports 21 based on a produced negative pressure. Then, in a compression stroke, the intake valves 19 are closed, and the piston 13 is moved upward. In conjunction with the upward movement of the piston 13, the air-fuel mixture in the combustion chamber 14 is compressed and thereby increased in temperature and pressure. In a final stage of the compression stroke, i.e., when the piston 13 is moved upward to a position close to TDC, a spark or arc is generated between electrodes of the spark plug 15, and the air-fuel mixture around the electrodes of the spark plug 15 is ignited by the spark to form a flame kernel.

In a subsequent expansion stroke, a frame front of the flame kernel is approximately spherically expanded to accelerate combustion. Due to the combustion, an in-cylinder pressure is rapidly increased to push the piston 13 downward. The downward force against the piston 13 will be transferred to an output shaft (crankshaft: not shown) through a connecting rod (not shown), etc., to produce a rotational driving force of the output shaft.

In a subsequent exhaust stroke, the exhaust values 20 are opened, and the piston 13 is moved upward again. In conjunction with the upward movement of the piston 13, burnt gas (exhaust gas) is pushed outside or discharged from the exhaust ports 22.

The above four-stroke cycle consisting of intake, compression, expansion and exhaust strokes will be repeatedly performed to continuously run the engine (four-cycle engine). In a multicylinder engine, each of the above stokes can be set at a different timing with respect to each cylinder to provide more smooth engine operation with less vibration and noise.

The combustion process in the expansion stroke will be more specifically described below. This combustion process is performed in a specific combustion mode, called "final-stage centered combustion" in this specification. In a condensed expression, the final-stage centered combustion is a combustion mode designed to perform combustion at a relatively low speed in an initial-stage primary combustion period (period where a combustible mass is burnt from 10% up to less than 50%), and at relatively high speed in a final-stage primary combustion period (period where the combustible mass is burnt from 50% up to less than 90%). The final-stage centered combustion is closely related to the combustion chamber structure according to this embodiment, and this combustion mode cannot be achieved without this combustion chamber structure.

In connection with the combustion chamber structure, the final-stage centered combustion will be described below. In response to a spark generated between electrodes of the spark plug 15, air-fuel mixture around the electrodes is ignited to form a flame kernel. Then, a frame front of the flame kernel (forefront of flame propagation) is expanded in an approximately concentric sphere pattern and propagated. That is, combustion is performed in the first combustion space 14a. During this combustion process, the flame front is expanded in such a manner as to push unburnt gas outside the first combustion space 14a.

In connection with this behavior, the small interspace zone 5 is provided around the outer circumference of the first combustion space 14a. Thus, the unburnt gas pushed out by the flame front is subjected to a sort of orificing action when it passes through the small interspace zone 5. This allows a combustion speed in the first combustion space 14a to be lowered to a relatively low value.

Then, when the flame front reaches the second combustion space 14b through the small interspace zone, it becomes free from influence of the orificing action due to the small interspace zone 5, and thereby the combustion speed in the second combustion space 14b has a relatively high value.

In this manner, combustion is performed at a relatively low speed during the initial primary combustion period primarily in the first combustion space 14a, and then at a relatively high speed during the final primary combustion period primarily in the second combustion space 14b, i.e., the final-stage centered combustion is performed.

In this embodiment, the sparking end of the spark plug 12 is located around the radial center of the cylinder bore 12, and the small interspace zone 5 is annularly defined to interpose between the sparking end of the spark plug 12 and the circumference of the cylinder bore. Further, the second combustion space 14b is annularly defined on the outward side of the outer circumference of the small interspace zone 5. This allows the orificing action of the small interspace zone 5 to be more evenly exerted on the combustion in the first combustion space 14a so as to provide further enhanced combustion-speed lowering effect.

In addition, the second combustion space 14b annularly defined on the outward side of the outer circumference of the small interspace zone 5 allows the flame front to more evenly reach the second combustion space 14b. This makes it possible to perform the combustion in the second combustion space 14b more quickly.

As the result, a significantly-differentiated distinctive final-stage centered combustion, where combustion is performed at lower speed during the initial primary combustion period and then at higher speed during the final primary combustion period, can be achieved.

As mentioned above, a frame front based on a flame kernel created around the electrodes of the spark plug 15 will be expanded in an approximately concentric sphere pattern. More precisely, a flame propagation speed toward an exhaust side is slightly greater than that toward an intake side. The reason is that a combustion reaction is more accelerated on the exhaust side having a higher temperature. In this embodiment, a gas flow toward the exhaust side is more strongly restricted than others by the minimum interspace sub-zone 5b, so as to relatively largely lower the flame propagation speed toward the exhaust side which is otherwise likely to be increased. This makes it possible to obtain more even flame propagation speed as a whole so as to facilitate smooth combustion. This also makes it possible to more evenly perform the propagation of flame front from the first combustion space 14a to the second combustion space 14b.

Figure 5:
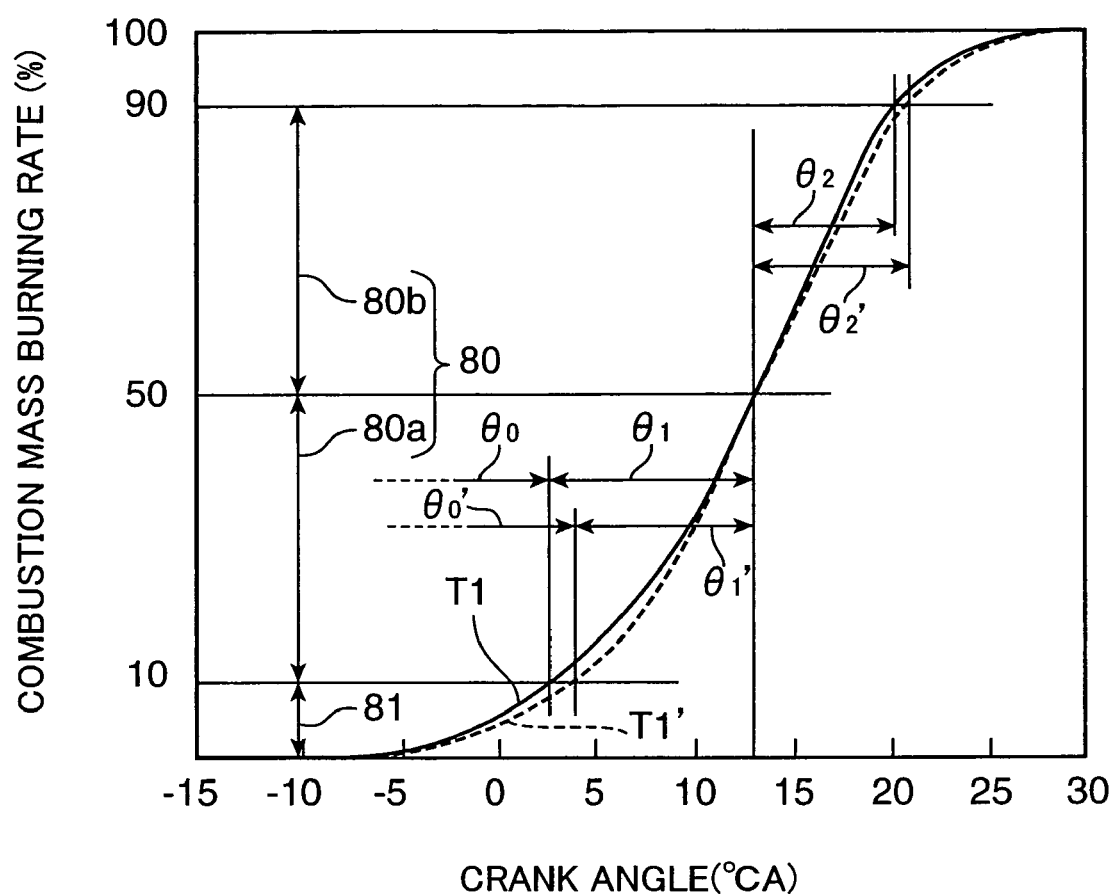
FIG. 5 is a graph showing a combustion characteristic curve of a final-stage centered combustion using the combustion chamber structure according to the first embodiment.

FIG. 5 is a graph showing a combustion characteristic curve of the final-stage centered combustion in this embodiment, wherein the horizontal axis and the vertical axis represent, respectively, a crank angle (° CA) and a combustion mass burning rate (%). The combustion mass burning rate means an integrated value of fuel mass burnt up to a time of a certain crank angle on the basis of 100% representing the entire burnt fuel mass (dimensionless value).

As shown in FIG. 5, an area having a combustion mass burning rate of less than 10% will be referred to as "initial combustion area 81" and a period of the initial combustion area 81 will be referred to as "initial combustion period $\theta_0$". Further, an area having a combustion mass burning rate of 10% to less than 90% will be referred to as "primary combustion area 80". The primary combustion area 80a is divided into initial and final stages on the basis of 50%. An area having a combustion mass burning rate of 10% to less than 50% will be referred to as "initial primary combustion area 80a" and an area having a combustion mass burning rate of 50% to less than 90% will be referred to as "final primary combustion area 80*b*". A period of the initial primary combustion area 80*a* will be referred to as "initial primary combustion period $\theta_1$)" and a period of the final primary combustion area 80*b* will be referred to as "final primary combustion period $\theta_2$".

FIG. 5 shows a combustion characteristic curve T1 in this embodiment, and a conventional typical combustion characteristic curve T1' for comparison. The characteristic curves in FIG. 5 were measured under the condition that the engine is operated at an engine speed of 1500 rpm and in a high load.

In the combustion characteristic curve T1 in this embodiment, the initial combustion period $\theta_0$ is a period from an ignition timing to about 3° CA. and the initial primary combustion period $\theta_1$ is a period from about 3 to 13° CA. Further, the final primary combustion period $\theta_2$ is a period from about 13 to 20° CA. In the conventional combustion characteristic curve T1', the initial combustion period $\theta_0$ is a period from an ignition timing to about 4° CA. and the initial primary combustion period $\theta_1$, is a period from about 4 to 13° CA. Further, the final primary combustion period $\theta_2$ is a period from about 13 to 21° CA.

That is, as compared with the conventional combustion characteristic curve T1', the combustion characteristic curve T1 in this embodiment is reduced in initial combustion period $\theta_0$ by about 1° CA. and extended in initial primary combustion period $\theta_1$ by about 1° CA. Further, the combustion characteristic curve T1 is reduced in final primary combustion period $\theta_2$ by about 1° CA. This combustion characteristic curve shows that a combustion speed in the initial primary combustion period $\theta_1$ to be primarily performed in the first combustion space 14*a* has a relatively low value, and a combustion speed in the final primary combustion period $\theta_2$ to be primarily performed in the second combustion space 14*b* has a relatively high value. In other words, the combustion characteristic curve in this embodiment shows the final-stage centered combustion.

Further, in the respective combustions in the initial combustion period $\theta_0$ and the initial primary combustion period $\theta_1$ which are to be primarily performed in the first combustion space 14*a*, the initial combustion period $\theta_0$ rather is reduced. This proves that the small interspace zone 5 is defined in an appropriate position which is not excessively close to the sparking end of the spark plug 15 (an appropriate position at 60 to 85% of a distance between the sparking end of the spark plug 15 and the circumference of the cylinder bore) so as to prevent the influence of the orificing action of the small interspace zone 5 from exerting in the initial combustion period $\theta_0$.

Figure 6:
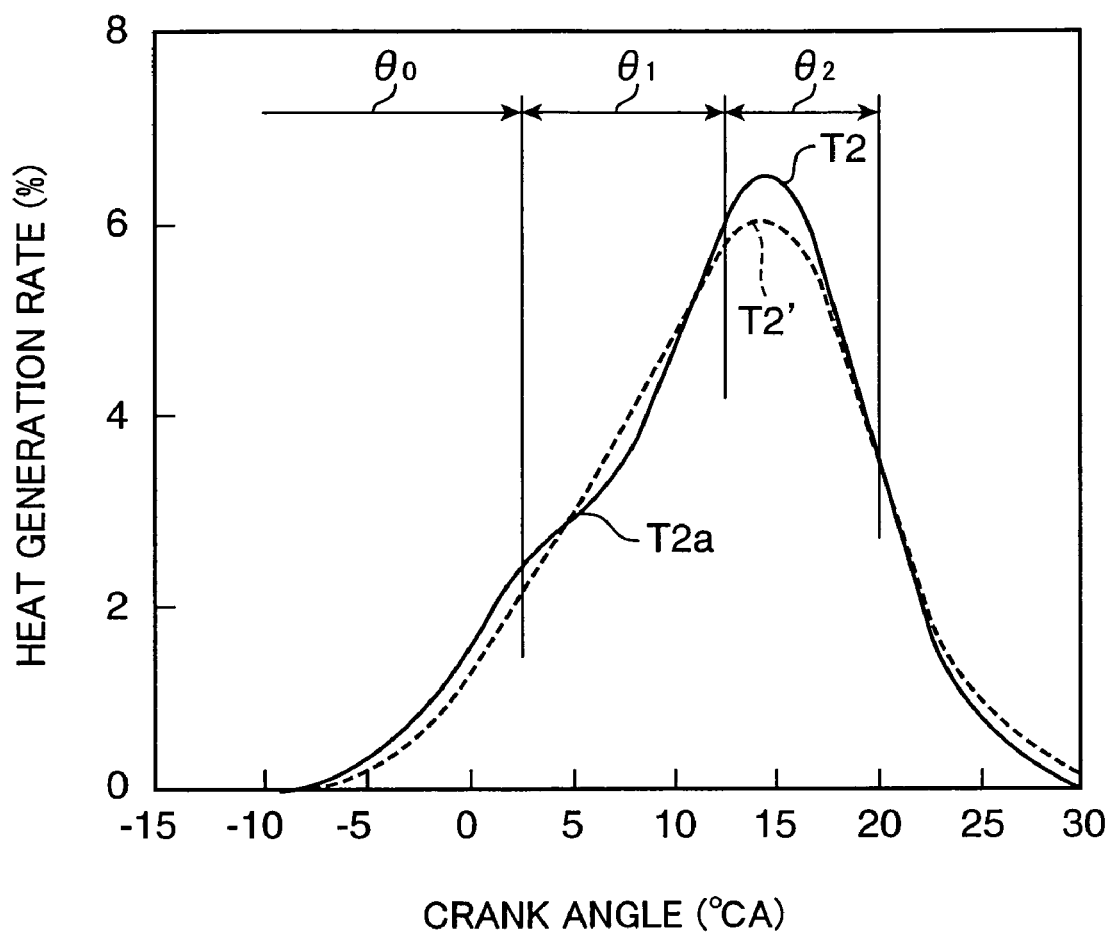
FIG. 6 is a graph showing a combustion characteristic curve obtained by differentiating the combustion characteristic curve in FIG. 5.

FIG. 6 is a graph representing the combustion characteristic curve illustrated in FIG. 5, in a different aspect, wherein the horizontal axis and the vertical axis represent, respectively, a crank angle (° CA.) and a heat generation rate (%). The heat generation rate means a differentiated value of a heat generation rate, and more specifically, a rate of heat generated at a time of a certain crank angle on the basis of 100% representing the entire generated heat.

FIG. 6 shows a combustion characteristic curve T2 in this embodiment, and a conventional typical combustion characteristic curve T2' for comparison. As compared with the characteristic curve T2', distinctive features of the characteristic curve T2 are in that the curve has a gentle slope portion T2*a* in the initial primary combustion period $\theta_1$, and a maximum value of a maximum heat generation rate is increased in the final primary combustion period $\theta_2$. The two points characterize the final-stage centered combustion.

More specifically, the gentle slope portion T2*a* shows that a rate of increase in heat generation rate is temporarily lowered just after transition from initial combustion period $\theta_0$ to the initial primary combustion period $\theta_1$. The reason would be that the combustion speed in the initial primary combustion period $\theta_1$ is relatively lowered by the orificing effect of the small interspace zone 5.

Further, the reason for the phenomenon that a maximum value of a maximum heat generation rate is then increased in the final primary combustion period $\theta_2$ would be that a relatively large amount of residual unburnt fuel is burnt at a high speed in the second combustion space 14*b* where a sufficient volume is ensured.

As above, the combustion chamber structure according to this embodiment makes it possible to perform the final-stage centered combustion readily in a simplified structure. In addition, the final-stage centered combustion performed in the above manner makes it possible to provide enhanced anti-knocking performance and increase compression ratio in a practically valuable manner. The inventors of the present invention verified that the compression ratio can be increased by 0.5 or more when an anti-knocking performance is maintained at the same level as that of the conventional structure. The capability of increasing compression ratio makes it possible to provide enhanced combustion efficiency and fuel economy.

With reference to FIG. 7 and FIGS. 8A to 8C, a second embodiment of the present invention will be described below.

Figure 7:
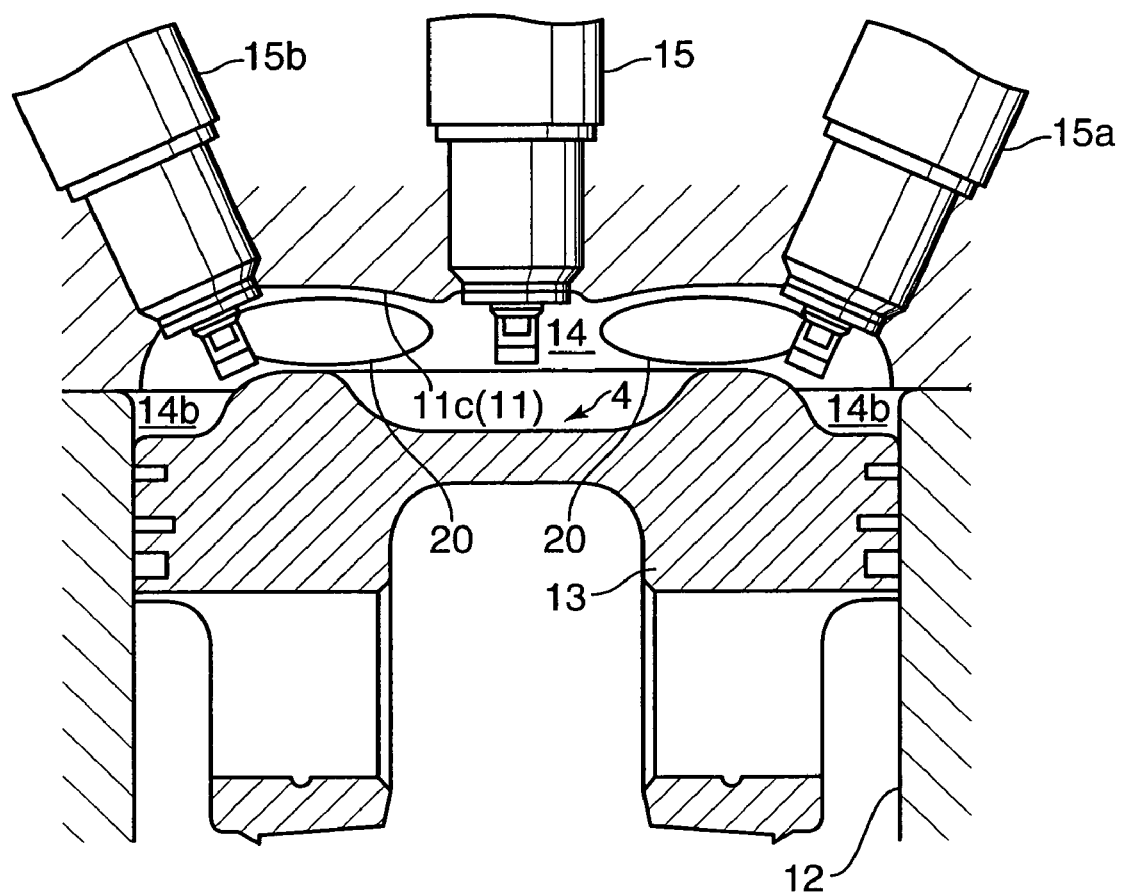
FIG. 7 is a sectional view showing a combustion chamber structure according to a second embodiment of the present invention, taken along a line equivalent to the line III-III in FIG. 1.

FIG. 7 is a sectional view showing a combustion chamber structure according to the second embodiment, taken along a line equivalent to the line III-III in FIG. 1. FIGS. 8A to 8C are explanatory diagrams of a swirl flow and a flame propagation, wherein FIG. 8A is a top plan view showing an intake-side ceiling wall, viewing from the side of a piston, and FIGS. 8B and 8C are schematic diagrams showing the configuration of a (secondary) intake port for a swirl generation intake system.

A major difference between the first and second embodiments is in that the combustion chamber structure according to the second embodiment is provided with a second spark plug 15*a* and a third spark plug 15*b* in addition to the spark plug 15 (see FIG. 7 and 8A), and a swirl generation intake system 23 (see FIG. 8A).

As shown in FIG. 7, the second spark plug 15*a* and the third spark plug 15*b* are arranged to allow respective sparking ends thereof to protrude from a connection region between the intake-side ceiling wall region 11*a* and the exhaust-side ceiling wall region 11*b*, i.e., a ridge region 11*c*, into the second combustion space 14*b*. For the reason of the structural of the pent-roof type combustion chamber 14, an interspace between the ceiling wall 11 and the piston top surface 4 is relatively increased in the vicinity of the ridge region 11*c*. Thus, the second spark plug 15*a* and the third spark plug 15*b* can be relatively easily arranged therein. The swirl generation intake system 23 is a conventional intake system for generating a strong swirl flow (a rotational flow about a sliding axis of the piston). In this embodiment, two intake valves 19 are provided with respect to each cylinder, and two corresponding (primary and secondary) intake ports are provided. A straight port 21*a* illustrated in FIG. 8C is used as the primary port, and a high-flow port 21*a* illustrated in FIG. 8B is used as the secondary port. As compared with the high-flow port 21*b*, the straight port 21*a* is opened to the combustion chamber 14 at a relatively shallow angle (i.e., closer to an angle perpendicular to the piston sliding angle). An operation of a spark-ignition engine with the combustion chamber structure according to this embodiment will be described below. In the following description, a common operation to that in the first embodiment will be appropriately omitted.

In an intake stroke, an air-fuel mixture is taken into the combustion chamber through the swirl generation intake system 23 to generate a strong swirl flow. Specifically, the intake valve 19 for the primary straight port 21a is opened in a relatively large lift amount (see FIG. 8C), and the intake valve 19 for the secondary high-flow port 21b is closed or opened in a relatively small lift amount (see FIG. 8B), to generate a clockwise strong swirl flow 75 as illustrated in FIG. 8A (in FIG. 8A, the flow is schematically shown).

Most of the swirl flow will be maintained even during a subsequent compression stroke. Then, in a final stage of the compression stroke, a spark is generated between electrodes of each of the spark plug 15, the second spark plug 15a and the third spark plug 15b. These sparks may be generated at the same timing or may be generated with appropriate delays. Respective air-fuel mixtures around the electrodes of the spark plug 15, the second spark plug 15a and the third spark plug 15b are ignited by the sparks to form flame kernels.

In a subsequent expansion stroke, each frame front of the flame kernels is approximately spherically expanded to accelerate combustion. This state is schematically shown as flame-propagation isochronal lines 70 indicated by two-dot chain lines in FIG. 8A. It is noted that the flame-propagation isochronal lines 70 are illustrated without taking into account of the following effect of the swirl flow 75. The flame-propagation isochronal lines 70 are densified in the intake side as compared with the exhaust side. This means that a flame propagation speed toward the intake side is lower than that toward the exhaust side. Thus, if no measure is taken, a delay in flame propagation toward the second combustion space 14b is likely to occur in the intake side.

With a focus on the swirl flow 75 in the vicinity of the second spark plug 15a and the intake valves 19, the second spark plug 15a is disposed immediately upstream of the intake valve 19 in a direction of the swirl flow. Thus, a flame from the second spark plug 15a can be rapidly propagated toward the intake side by the swirl flow. This makes it possible to effectively prevent a delay in flame propagation toward the second combustion space 14b so as to perform combustion in the second combustion space 14b at an adequate timing.

As above, according to this embodiment, even in the case where there is the risk of a delay in flame propagation toward the second combustion space 14b, combustion in the second combustion space 14b can be performed at an adequate timing. Thus, the final-stage centered combustion can be effectively performed.

A third embodiment of the present invention will be described below. In this embodiment, a tumble generation port is used as the intake port 21. Specifically, the tumble generation port is designed such that a tumble flow generated from a throat of the port has a higher speed in an exhaust-side (exhaust-port side) zone than that in a zone on the side of a wall surface of the cylinder bore 12 (i.e., to generate a normal tumble flow). The remaining structure or configuration is the same as that in the first embodiment.

This embodiment can solve the following problem in a conventional technique.

Heretofore, it has be believed that, in a combustion chamber structure associated with a tumble generation port, a reduction in tumble ratio, i.e., lowing in tumble generation ability, is effective in improving an anti-knocking performance, particularly, in a high-load range.

However, recently, it has been found out that an anti-knocking performance in a high-load range cannot be always obtained by reducing a tumble ratio to lower a tumble generation ability. FIG. 11 is a schematic diagram showing results of a numerical analysis performed by the inventors to figure out the reason of such phenomenon.

Figure 11A:
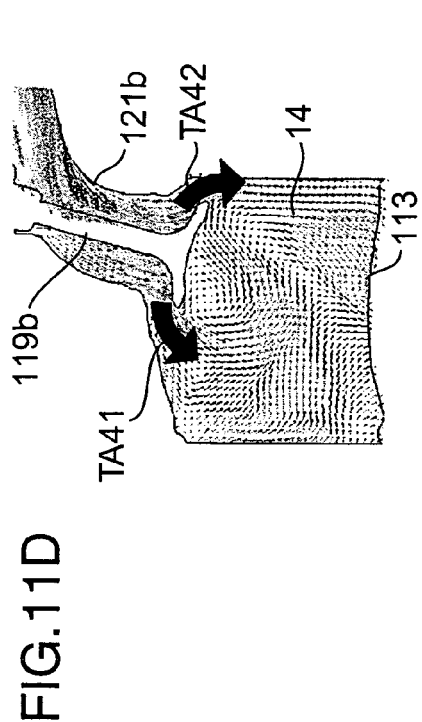
FIG. 11A is a schematic diagram showing a tumble flow (tumble ratio=0.7) in a middle stage of an intake stroke, in a conventional structure.
Figure 11B:
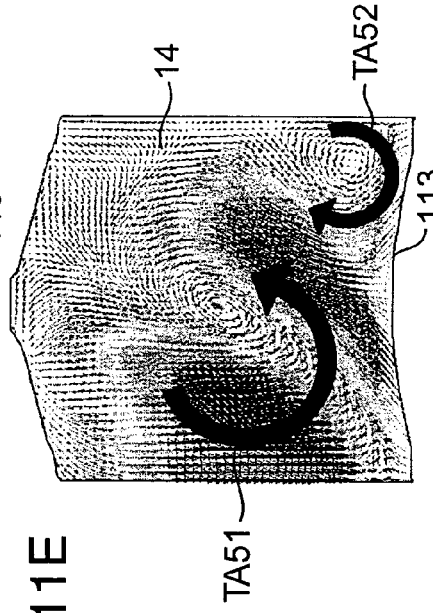
FIG. 11B is a schematic diagram showing a tumble flow (tumble ratio=0.7) in an initial stage of a compression stroke, in the conventional structure.
Figure 11C:
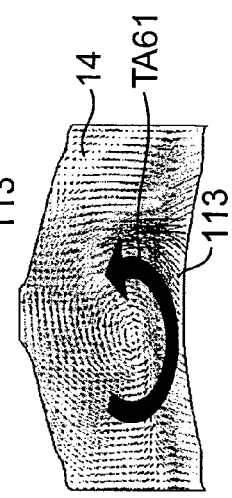
FIG. 11C is a schematic diagram showing a tumble flow (tumble ratio=0.7) in a final stage of the compression stroke, in the conventional structure.
Figure 11D:
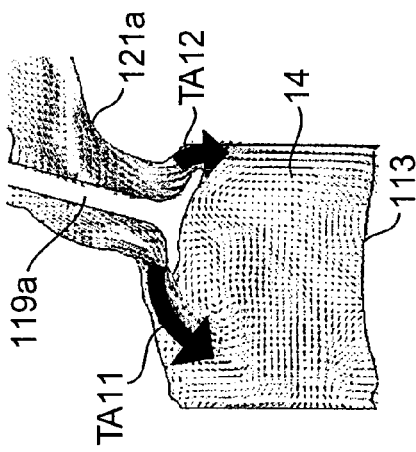
FIG. 11D is a schematic diagram showing a tumble flow (tumble ratio=0.2) in the middle stage of the intake stroke, in the conventional structure.
Figure 11E:
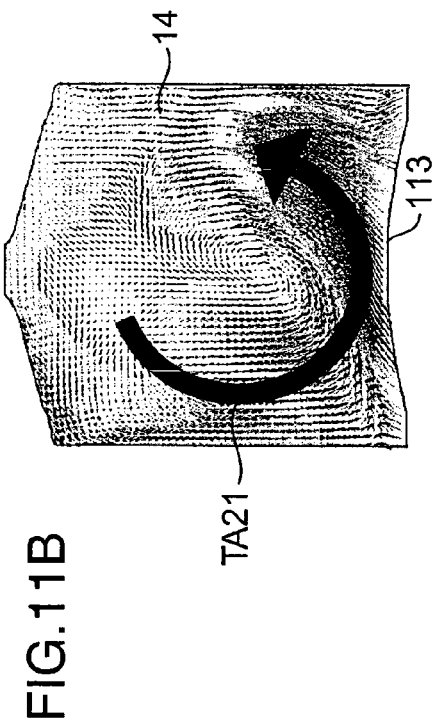
FIG. 11E is a schematic diagram showing a tumble flow (tumble ratio=0.2) in the initial stage of the compression stroke, in the conventional structure.
Figure 11F:
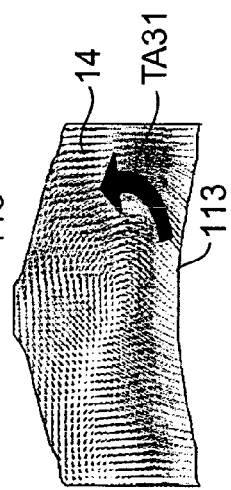
FIG. 11F is a schematic diagram showing a tumble flow (tumble ratio=0.2) in the final stage of the compression stroke, in the conventional structure.

All FIGS. 11A to 11F are vertical sectional views showing in-cylinder flows, particularly, tumble flows, during a period from an intake stroke to a compression stroke in the conventional combustion chamber. FIGS. 11A, 11B and 11C show the results using an intake port 121a having a tumble ratio of 0.7, and FIGS. 11D, 11E and 11F show the results using an intake port 121a having a tumble ratio of 0.2. FIGS. 11A and 11D show states when a piston is at BTDC (Before Top Dead Center) 270 degrees (in an intermediate stage of an intake stroke), and FIGS. 11B and 11E show states when a piston is at BTDC (Before Top Dead Center) 130 degrees (in an initial stage of a compression stroke). Further, FIGS. 11C and 11F show states when a piston is at BTDC (Before Top Dead Center) 60 degrees (in a final stage of the compression stroke).

In the case where the tumble ratio is set at 0.7, as shown in FIG. 11A, an intake valve 119a is opened in an intake stroke, and an air-fuel mixture is introduced into a combustion chamber 14 from a clearance (throat) between the intake valve 119a and the intake port 121a in conjunction with a downward movement of a piston 113. Thus, a normal tumble flow TA11 is generated from a high flow-speed zone (left in FIG. 11A), and a reverse tumble flow TA12 is generated from a low flow-speed zone.

In an initial stage of a subsequent compression stroke, as shown in FIG. 11B, the normal tumble flow beats the reverse tumble flow to form a single strong normal tumble flow TA21.

In a final stage of the compression stroke, as shown in FIG. 11C, a breakdown of the tumble blow is observed and only a weak normal tumble TA31 remains.

The case where the tumble ratio is set at 0.2 will be described below. As shown in FIG. 11D, an intake valve 119b is opened in an intake stroke, and an air-fuel mixture is introduced into the combustion chamber 14 from a clearance (throat) between the intake valve 119b and the intake port 121b in conjunction with a downward movement of the piston 113. Thus, a normal tumble flow TA41 is generated from a high flow-speed zone (left in FIG. 11A), and a reverse tumble flow TA42 is generated from a low flow-speed zone.

In an initial stage of a subsequent compression stroke, as shown in FIG. 11E, a normal tumble flow TA51 and a reverse tumble flow TA52, which are not so strong, flow and join together in the vicinity of a central region of the combustion chamber 14.

In a final stage of the compression stroke, as shown in FIG. 11F, while some breakdown of the tumble blow is observed, a relatively strong normal tumble TA61 remains.

As above, the results shows that a strong tumble flow remains in the structure with the port illustrated in FIGS. 11D to 11F having a smaller tumble ratio which has been believed that it provides a lower tumble generation ability. It is believed that this phenomenon results from an interaction of the normal and reverse tumble flows as shown in FIG. 11E.

Figure 9:
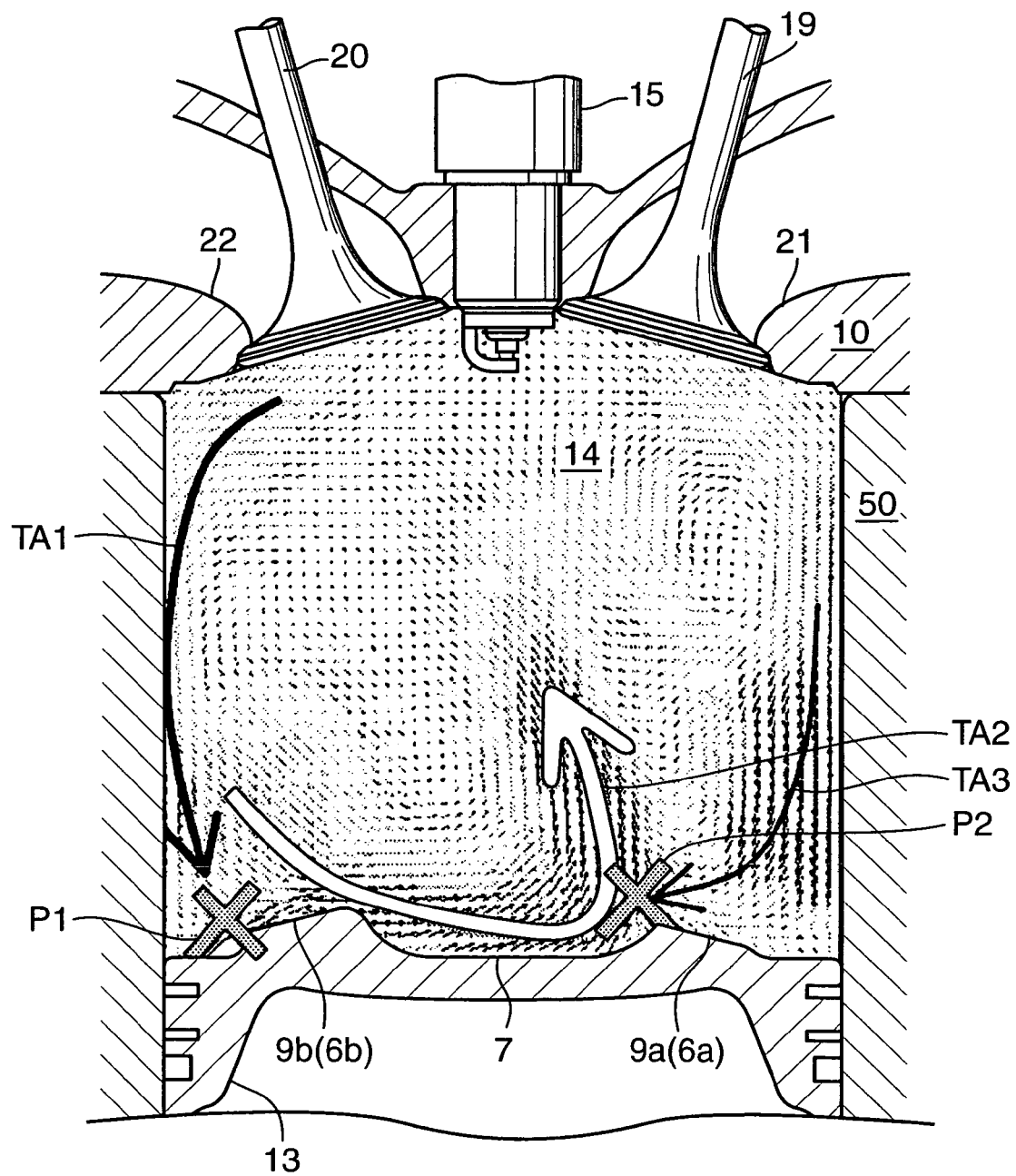
FIG. 9 is a vertical sectional view showing a tumble flow in a combustion chamber structure according to a third embodiment of the present invention.

With a view to solving the above problem, a tumble flow in this embodiment is effectively weakened in the following manner. FIG. 9 is a vertical sectional view of the combustion chamber 14 under the condition that the piston 13 is at BTDC 130 degrees (in an initial stage of a compression stroke). A counterclockwise relatively strong normal tumble flow TA1 and a clockwise relatively weak reverse tumble flow TA3 are generated from a high intake-flow speed zone (exhaust side) of a throat of the intake port 21, as shown in FIG. 9.

When the piston 13 is moved upward, the normal tumble flow TA1 is weaken due to collision with the top surface 9b of the first convex area 6b, at a point P1 in an approximately perpendicular direction. Further, a flow direction of a component of the normal tumble flow TA1 having no collision with the top surface 9b (this component will hereinafter be referred to as ("normal tumble flow TA2") is changed upward by the central concave area 7. Then, the normal tumble flow TA2 flows to be opposed to the reverse tumble flow TA3 at a point P2, so that both the tumble flows TA2, TA3 are weakened mutually.

In this manner, both the normal tumble flow TA1 and the reverse tumble flow TA3 are weakened, and will become very weak tumble flows by a final stage of the combustion stroke. Thus, in combination with the aforementioned effects of the final-stage centered combustion, enhanced anti-knocking performance can be obtained.

Figure 10:
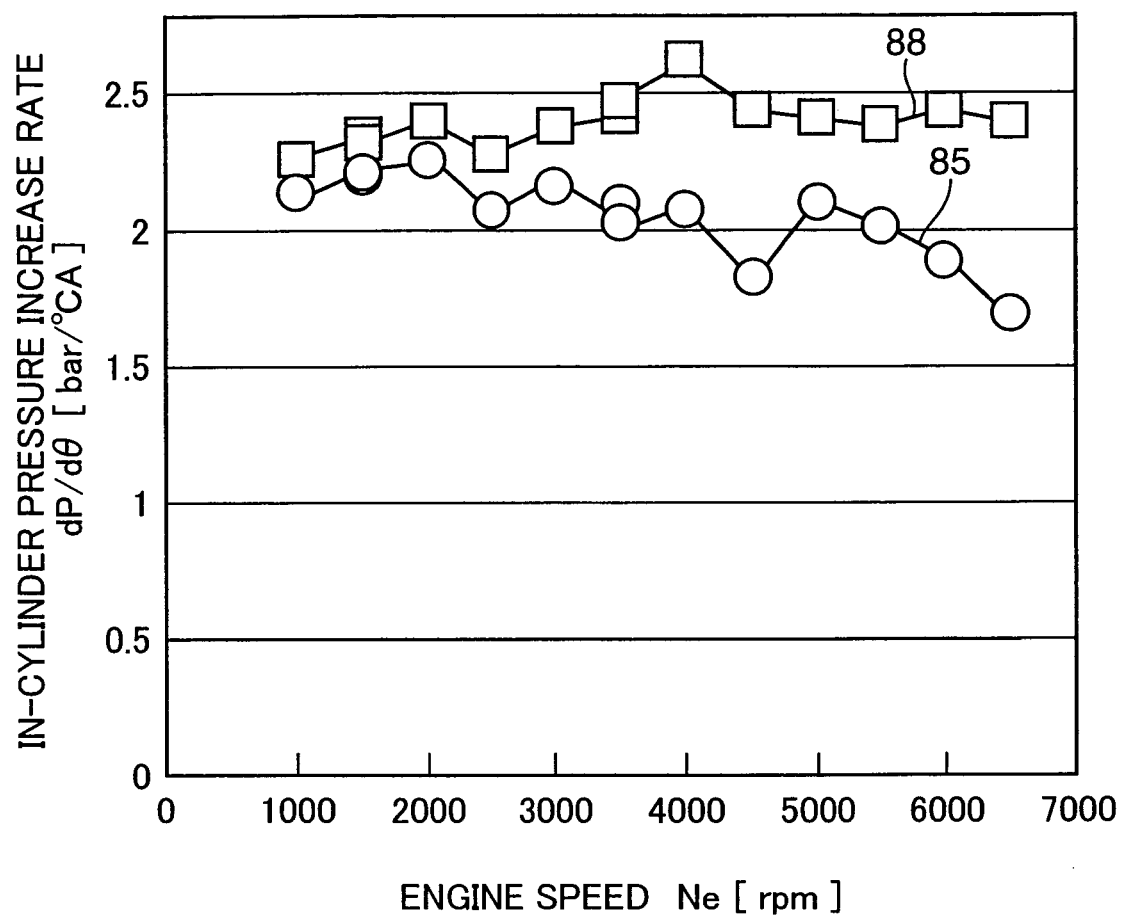
FIG. 10 is a graph showing a rate of increase in in-cylinder pressure, in the third embodiment.

FIG. 10 is a graph showing a rate of increase in in-cylinder pressure (in-cylinder pressure increase rate) dP/dθ in this embodiment. The in-cylinder pressure increase rate dP/dθ is an index in which a higher value indicates a higher risk of occurrence of knocking and deterioration of NVH (Noise, Vibration, Harshness). In FIG. 10, the horizontal axis and the vertical axis represent, respectively, an engine speed Ne (rpm) and an in-cylinder pressure increase rate dP/dθ (bar/° CA.). Fundamental specifications include compression ratio =10.6 and tumble ratio of the intake port 21=1.1. The characteristic curve 85 corresponds a characteristic in this embodiment, and a characteristic curve 88 in the conventional structure (piston 113 illustrated in FIGS. 11A to 11F) is additionally shown for comparison.

As seen in FIG. 10 where the in-cylinder pressure increase rate dP/dθ of the characteristic curve 85 is less than that of the characteristic curve 88 in the entire range from a low engine-speed range to a high engine-speed range, a significant effect could be verified. Particularly, in an engine operation range where the engine speed is 5000 rpm or more, the effect of suppressing knocking and detonation in a high load range and NVH is remarkably observed.

While the present invention has been described based on the specific embodiments thereof, the present invention is not limited to such embodiments, but various changes and modifications may be made therein without departing from the spirit and scope of the present invention.

For example, while the above embodiments have been described in connection with an example where the present invention is applied to a four-cycle engine, the present invention may be applied to any other type of engine, such as two-cycle engine.

While the configuration of the combustion chamber 14 in the first embodiment is preferably a pent-roof type, it may be any other suitable configuration, such as a semi-spherical shape (dome shape) or a multi-spherical shape.

While it is preferable that the spark plug 15 is disposed around the radial center of the cylinder bore 12, and the small interspace zone 5 and the second combustion space 14b are defined to surround the first combustion space 14a, it is not essential to use such an arrangement. For example, the small interspace zone 5 may have any other suitable configuration, such as an annular portion having one or more notched spaces. Further, according to need, a single spark plug may be installed around a circumferential region of the cylinder bore 12.

While it is preferable that the minimum interspace sib-zone 5b is defined in an intermediate position between the sparking end of the spark plug 15 and at least an exhaust-side region of the circumference of the cylinder bore, it is not essential to use such an arrangement. For example, the minimum interspace sub-zone may be defined at a position corresponding to that of the intake-side small interspace sub-zone 5a.

In the second embodiment, it is not essential to use the third spark plug 15b. The third spark plug 15b disposed immediately upstream of the exhaust valve 20 in a direction of the swirl flow allows a flame to be propagated from the sparking end of the third plug 15b together with the swirl flow 75 flowing toward the exhaust side. This has an advantage of being able to allow a flame to be propagated toward the exhaust side. When one of the second spark plug 15a and the third spark plug 15b is selected as an additional spark plug for use with the spark plug 15, it is preferable to select the second spark plug 15a. The reason is that the flame propagation toward the intake side is generally slower than that toward the exhaust side, and the second spark plug 15a has a potential to provide a significant effect of being able to effectively suppress the delay in flame propagation.

While the normal tumble-type intake port for generating a stronger tumble flow in the exhaust-side zone is employed in the third embodiment, a reverse tumble-type intake port for generating a stronger tumble flow in the zone on the side of the cylinder bore wall may be employed. In this case, a height of the intake-side second convex area 6a may be increased (so that the height of the second convex area 6a becomes higher than that of the intake-side first convex area 6b) to allow the reverse tumble flow to collide with the second convex area 6a.

As described above based on the specific embodiments, according to one aspect of the present invention, there is provided a combustion chamber structure for a spark-ignition engine, which comprises a combustion chamber defined between a bottom surface of a cylinder head and a top surface of a piston in such a manner that the bottom surface of the cylinder head serves as a ceiling wall thereof, and a spark plug having a sparking end protruding from the ceiling wall into the combustion chamber. In this combustion chamber structure, when the piston is at a top dead center, a principal space of the combustion chamber is comprised of a first combustion space around the sparking end of the spark plug and a second combustion space around a circumference of a cylinder bore. Further, the first combustion space and the second combustion space are communicated with each other through a small interspace zone where an interspace between the ceiling wall and the top surface of the piston is narrowed.

According to the combustion chamber structure of the present invention, the final-stage centered combustion can be readily performed, as described later. In addition, as mentioned above, the final-stage centered combustion makes it possible to provide enhanced anti-knocking performance and increase compression ratio in a practically valuable manner. Further, this ability can be utilized to achieve enhanced fuel economy.

In the combustion chamber structure of the present invention, combustion in the initial primary combustion period is performed primarily in the first combustion space located adjacent to the sparking end of the spark plug, and combustion in the final primary combustion period is performed primarily in the second combustion space located in the circumference of the cylinder bore. Generally, the combustion is performed along with flame propagation, and a flame front (forefront of flame propagation) is expanded in an approximately concentric sphere pattern based on a flame kernel created around electrodes of the spark plug while pushing unburnt gas.

In the combustion chamber structure of the present invention, the small interspace zone formed by narrowing an interspace between the ceiling wall of the combustion chamber and the top surface of the piston is interposed between the first and second combustion spaces. Thus, the unburnt gas pushed out by the flame front is subjected to a sort of orificing action when it passes through the small interspace zone. This allows a combustion speed during the initial primary combustion period to be reduced to a relatively low value.

Then, when the flame front reaches the second combustion space through the small interspace zone, it becomes free from influence of the orificing action due to the small interspace zone, and thereby the flame propagation speed is increased. That is, the combustion speed during the final primary combustion period is relatively increased.

In this manner, combustion is performed at a relatively low speed during the initial primary combustion period, and then at a relatively high speed during the final primary combustion period, i.e., the final-stage centered combustion is performed.

The inventors of the present invention verified that the combustion chamber structure of the present invention allows the compression ratio to be increased by 0.5 or more without deterioration in anti-knocking performance.

In the combustion chamber structure of the present invention, the small interspace zone may be defined in a position closer to the circumference of the cylinder bore than a midpoint between the sparking end of the spark plug and the circumference of the cylinder bore in a radial direction of the cylinder bore.

This combustion chamber structure makes it possible to rapidly complete the initial combustion period (a period where 10% of a combustible mass is burnt before the primary combustion period) so as to effectively prevent a delay in transition to the primary combustion period, as described below.

As mentioned above, the combustion in the initial primary combustion period is performed primarily in the first combustion space. Thus, the combustion in the preceding initial combustion period is also performed primarily in the first combustion space. If a distance between the sparking end of the spark plug and the small interspace zone is excessively reduced, the combustion in the initial combustion period is largely affected by the orificing action of the small interspace zone, and the combustion speed in the initial combustion period is lowered. The lowering of the combustion speed in the initial combustion period causes a delay in transition to the primary combustion period, which undesirably leads to a delay in the entire combustion.

In this combustion chamber structure, the small interspace zone is defined in a position closer to the circumference of the cylinder bore than a midpoint between the sparking end of the spark plug and the circumference of the cylinder bore in a radial direction of the cylinder bore. That is, the sparking end of the spark plug and the small interspace zone are spaced apart from each other by an appropriate distance. This makes it possible to substantially prevent the influence of the orificing action of the small interspace zone from being exerted on the initial combustion period.

However, if the small interspace zone is defined in a position excessively close to the circumference of the cylinder bore, a volume of the second combustion space cannot be adequately ensured. Thus, it is preferable that the small interspace zone is defined in an position closer to the circumference of the cylinder bore than a midpoint between the sparking end of the spark plug and the circumference of the cylinder bore in a radial direction of the cylinder bore, and spaced apart from the circumference of the cylinder bore by an appropriate distance. While such an appropriate position of the small interspace zone is varied depending on engine characteristics, it is generally in the range of 60 to 85% of a distance between the sparking end of the spark plug and the circumference of the cylinder bore.

The combustion chamber structure of the present invention may be designed as follows: the sparking end of the spark plug is located around a radial center of the cylinder bore; the small interspace zone is annularly defined to interpose between the sparking end of the spark plug and the circumference of the cylinder bore; and the second combustion space is annularly defined on an outward side of an outer circumference the small interspace zone.

This combustion chamber structure makes it possible to achieve more distinctive final-stage centered combustion so as to more effectively enhance the anti-knocking performance, as described below.

As above, the small interspace zone is annularly defined to interpose between the sparking end of the spark plug and the circumference of the cylinder bore. That is, small interspace zone is defined to surround the first combustion space. This allows the orificing action of the small interspace zone to be more evenly exerted on the combustion in the first combustion space so as to provide further enhanced combustion-speed lowering effect in the initial primary combustion period.

In addition, the second combustion space annularly defined on the outward side of the outer circumference of the small interspace zone allows the flame front to more evenly reach the second combustion space. This makes it possible to perform the combustion in the second combustion space more quickly.

As the result, a significantly-differentiated distinctive final-stage centered combustion, where combustion is performed at lower speed during the initial primary combustion period and then at higher speed during the final primary combustion period, can be achieved.

The combustion chamber structure of the present invention may be designed as follows: the sparking end of the spark plug is located around a radial center of the cylinder bore; and the small interspace zone includes a minimum interspace sub-zone having the narrowest interspace therewithin, wherein the minimum interspace sub-zone is defined in an intermediate position between the sparking end of the spark plug and at least an exhaust-side region of the circumference of the cylinder bore.

This combustion chamber structure makes it possible to obtain more even flame propagation speed as a whole so as to facilitate smooth combustion, as described below.

As mentioned above, a frame front based on a flame kernel created around the electrodes of the spark plug will be expanded in an approximately concentric sphere pattern. More precisely, a flame propagation speed toward an exhaust side (exhaust-valve side) is slightly greater than that toward an intake side (intake-valve side). The reason is that a combustion reaction is more accelerated on the exhaust side having a higher temperature.

In this combustion chamber structure, the minimum interspace sub-zone is defined in an intermediate position between the sparking end of the spark plug and at least one exhaust-side region of the circumference of the cylinder bore. Thus, the flame propagation toward the exhaust side is particularly restricted by a strong orificing action of the minimum interspace sub-zone, so as to restrict the flame propagation speed, particularly, toward the exhaust side. That is, the flame propagation speed toward the exhaust side which is otherwise is likely to be increased can be relatively strongly restricted. This makes it possible to obtain more even flame propagation speed as a whole so as to facilitate smooth combustion. Further, the aforementioned structure where the small interspace zone is annularly defined to interpose between the sparking end of the spark plug and the circumference of the cylinder bore, and the second combustion space is annularly defined on an outward side of an outer circumference the small interspace zone, may be combined to more evenly perform the propagation of flame front from the first combustion space to the second combustion space so as to more effectively enhance the anti-knocking performance.

The combustion chamber structure of the present invention may be designed as follows: the. piston has a crown which is formed with a convex portion protruding toward the ceiling wall, and a concave portion concaved relative to the convex section; the small interspace zone is defined between the ceiling wall and a top surface of the convex portion; and each of the first combustion space and the second combustion space is defined between the concave portion and the ceiling wall.

The combustion chamber structure of the present invention may be designed as follows: the sparking end of the spark plug is located around a radial center of the cylinder bore; the convex portion is formed in an annular shape approximately concentric with the circumference of the cylinder bore; and the convex portion has a protruding height which is relatively greater in an exhaust-side region thereof as compared with an intake-side region thereof.

This combustion chamber structure makes it possible to define the first combustion space, the small interspace zone and the second combustion space, in a simplified structure where concave and convex portions are formed in the piston crown.

The combustion chamber structure of the present invention may be designed as follows: the combustion chamber is designed as a pent-roof type in which the ceiling wall has an intake-side ceiling wall region and an exhaust-side ceiling wall region each formed in a roof shape; an interspace between the top surface of the piston and a ridge region of the pent-roof-shaped ceiling wall is set to be greater than that between the top surface of the piston and the ceiling wall region surrounding the ride region; and the combustion chamber structure includes a second spark plug having a sparking end protruding from the ridge region of the pent-roof-shaped ceiling wall into the second combustion space.

This combustion chamber structure makes it possible to utilize a feature of the pent-roof type combustion chamber capable of reducing a combustion chamber volume while ensuring relatively large intake and exhaust valve diameters, so as to further facilitate increase in compression ratio.

The pent-roof type combustion chamber is also characterized in that an interspace between the ridge region of the ceiling wall and the top surface of the piston is relatively wide. In the above combustion chamber structure, the second spark plug is installed in the ridge region having a wide interspace. Thus, the second spark plug can be easily arranged. Further, even in the case where there is the risk of a delay in flame propagation toward the second combustion space, combustion in the second combustion space can be performed at an adequate timing.

In the combustion chamber structure of the present invention, the spanking-ignition engine may include an intake system provided with an intake valve and adapted to generate a swirl flow in the combustion chamber, and the sparking end of the second spark plug may be located immediately upstream of the intake valve in a direction of the swirl flow.

In this combustion chamber structure, the second spark plug is disposed immediately upstream of the intake valve in a direction of the swirl flow. Thus, a flame from the second spark plug can be rapidly propagated toward the intake side by the swirl flow. This makes it possible to effectively prevent a delay in flame propagation toward the second combustion space so as to perform combustion in the second combustion space at an adequate timing.

In the combustion chamber structure of the present invention, the combustion chamber may be designed as a pent-roof type in which said ceiling wall has an intake-side ceiling wall region and an exhaust-side ceiling wall region each formed in a roof shape, and a part of the ceiling wall adjacent to the circumference of the cylinder bore may be formed to be offset relative to a matching surface of the cylinder head with the cylinder block in a direction away from the cylinder block.

Figure 12:
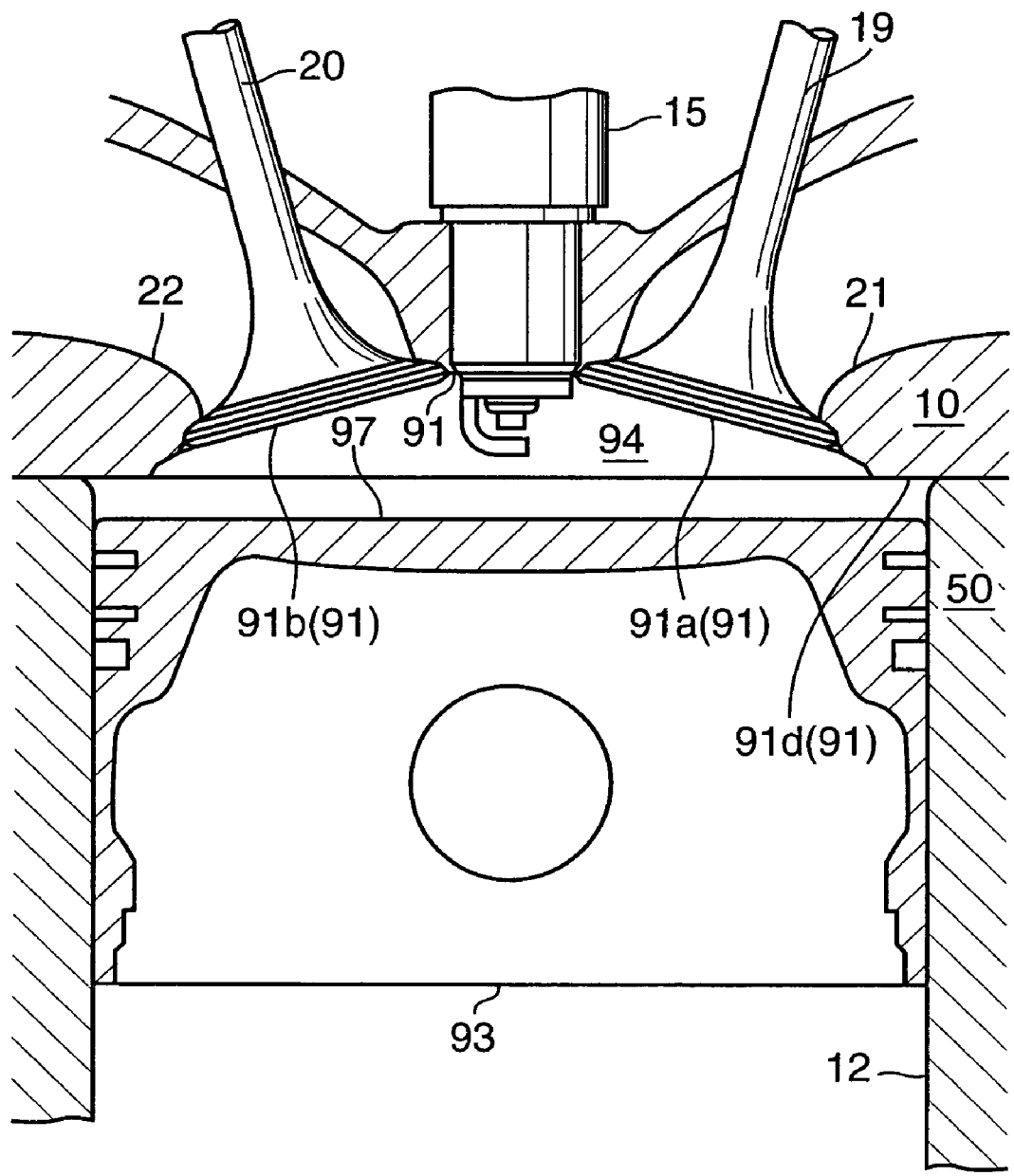
FIG. 12 is a vertical sectional view showing a conventional typical pent-roof type combustion chamber structure.

This combustion chamber structure makes it possible to increase a volume of the second combustion space. In a conventional pent-roof type combustion structure, a portion of a cylinder head corresponding to a circumference of the cylinder bore (a circumferential region of a ceiling wall of a combustion chamber) is designed to be approximately flush with a matching surface of the cylinder head with a cylinder block (see the circumferential region 91d of the ceiling wall 91 in FIG. 12). In contrast, the above combustion chamber structure is designed such that the ceiling wall of the combustion chamber is offset in a direction away from the cylinder block so as to increase a volume of the second combustion space.

The combustion chamber structure of the present invention may be designed as follows: the ceiling wall has a first half region formed with an intake opening of an intake port adapted to generate a tumble flow, and a second half region formed with an exhaust opening of an exhaust port; the piston has a crown formed with a first convex area between the first and second combustion spaces and on the side of a zone of a throat of the intake port which has a relatively high intake flow speed on the basis of an intake flow speed at a center of the intake opening in top plan view, wherein the first convex area protrudes from a first region of an upper surface of the crown at a height greater than that in a second region of the upper surface of the crown on the opposite side of the first region with respect to a center of the cylinder bore in top plan view; and the intake port is adapted to allow the tumble flow generated from the throat to collide with the first convex area.

The above combustion chamber structure makes it possible to maximally weaken a tumble flow remaining by a final stage of a compression stroke, and prevent a flame kernel created by ignition from being biased toward the exhaust side to cause deterioration in anti-knocking performance due to unevenness in flame propagation between the intake and exhaust sides, so as to provide a spark-ignition engine advantageous in increasing compression ratio, as describe below. That is, this combustion chamber structure makes it possible to weaken a tumble flow in a final stage of a compression stroke and perform the final-stage centered combustion, in a simplified structure having the first convex area formed on the piston crown, so as to provide enhanced anti-knocking performance, particularly, in a high-load range, and advantage in increasing compression ratio.

In the above combustion chamber structure, a tumble flow created from a throat of the intake port is firstly weakened by collision with the first convex area. Further, the tumble flow is prevented from joining with another tumble flow from an opposite direction. This makes it possible to effectively weaken a tumble flow which otherwise remains by a final stage of a compression stroke. Further, an intake port having a low tumble ratio may be used in combination to adequately reduce the strength of actual tumble flow.

In the combustion chamber structure of the present invention associated with the above intake port capable of generating a tumble flow, the crown of the piston may have a central region formed with a central concave area and adapted to allow a part of the tumble flow having no collision with the first convex area to flow in a direction opposed to a reverse tumble flow supplied from a zone of the throat having a relatively low intake flow speed.

This combustion chamber structure makes it possible to allow a part of the tumble flow having no collision with the first convex area to flow in a direction opposed to a reverse tumble flow supplied from a zone of the throat having a relatively low intake flow speed. Thus, the tumble flow can be more significantly weakened.

In the combustion chamber structure of the present invention associated with the above intake port capable of generating a tumble flow, the intake port may be designed as a normal-tumble flow generation port in which the zone of the throat having a relatively high intake flow speed is located on the side of the exhaust opening, and the first convex area may be located on the side of the exhaust opening relative to the sparking end of the spark plug in top plan view.

In this combustion chamber structure, the first convex area is disposed on the exhaust side having a high flame propagation speed to allow the orificing effect of the small interspace zone to be further increased. This makes it possible to more distinctively perform the final-stage centered combustion.

The combustion chamber structure of the present invention associated with the above intake port capable of generating a tumble flow may be designed as follows: the crown of the piston is formed with a convex portion including the first convex area and protruding annularly in top plan view; the convex portion further includes a second convex area formed on the opposite side of the first convex area with respect to a central region of the upper surface of the crown to protrude at a height less than that of the first convex area; and the second combustion space is defined to extend from an outer circumference of the convex portion to an outer circumference of the piston when the piston is at the top dead center.

This combustion chamber structure makes it possible to fill a space other than the first and second combustion spaces, with the convex portion, so as to facilitate achieving a high compression ratio structure. In addition, the first combustion space can be designed to have a sufficient volume below the spark plug.

The combustion chamber structure of the present invention associated with the above intake port capable of generating a tumble flow may be designed as follows: the ceiling wall is formed in a pent-roof shape; the first convex area is formed to protrude from a position spaced apart from an outer circumference of the upper surface of the crown by a given distance toward the central region of the upper surface; and the first convex area is formed to have a top surface approximately parallel to a sloping region of the ceiling wall.

In this combustion chamber structure, the small interspace zone between the ceiling wall and the first convex area can be formed as a marrow channel defined by parallel plains so as to obtain a stronger orificing effect. Further, a tumble flow will collide with the top surface of the first convex area approximately perpendicularly. This makes it possible to obtain a high tumble-flow adjusting effect.

This application is based on Japanese patent application Nos. 2005-268439 and 2005-289264, filed with Japan Patent Office on Sep. 15, 2005 and Sep. 30, 2005 respectively, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A combustion chamber structure for a spark-ignition engine, comprising:
   a combustion chamber defined between a bottom surface of a cylinder head and a top surface of a piston in such a manner that the bottom surface of said cylinder head serves as a ceiling wall thereof;
   and a spark plug having a sparking end protruding from the ceiling wall into the combustion chamber, wherein:
   when said piston is at a top dead center, a principal space of the combustion chamber is parted into a first combustion space around the sparking end of said spark plug and a second combustion space around a circumference of a cylinder bore,
   said ceiling wall and the top surface of said piston are configured such that a narrowed space is formed therebetween so that said narrowed space functions as a small interspace zone which communicates between said first combustion space and said second combustion space
   said spark plug is located around a radial center of said cylinder bore; and
   said small interspace zone includes a small interspace sub-zone and a minimum interspace sub-zone said small interspace sub-zone being defined in an intermediate position between said spark plug and at last an intake-side region of the circumference of said cylinder and said minimum interspace sub-zone being defined in an intermediate position between said spark plug and at least an exhaust-side region of the circumference of said cylinder bore with said minimum interspace sub-zone being narrower than the small interspace sub-zone.

2. The combustion chamber structure as defined in claim 1, wherein said small interspace zone is defined in a position closer to the circumference of said cylinder bore than a midpoint between said spark plug and the circumference of said cylinder bore in a radial direction of said cylinder bore.

3. The combustion chamber structure as defined in claim 1, wherein said spark plug is located around a radial center of said cylinder bore;
   said small interspace zone is annularly defined in between the sparking end of said spark plug and the circumference of said cylinder bore; and said second combustion space is annularly defined on a radially outward of an outer circumference of said small interspace zone.

4. The combustion chamber structure as defined in claim 1, wherein said piston has a crown which is formed with a convex portion protruding toward said ceiling wall, and a concave portion concaved relative to said convex section;
said small interspace zone is defined between said ceiling wall and a top surface of said convex portion; and each of said first combustion space and said second combustion space is defined between said concave portion and said ceiling wall.

5. The combustion chamber structure as defined in claim 4, wherein said spark plug is located around a radial center of said cylinder bore;
said convex portion is formed in an annular shape approximately concentric with the circumference of said cylinder bore; and
said convex portion has a protruding height which is relatively greater in an exhaust-side region thereof as compared with an intake-side region thereof.

6. The combustion chamber structure as defined in claim 1, wherein said combustion chamber is designed as a pent-roof type in which said ceiling wall has an intake-side ceiling wall region and an exhaust-side ceiling wall region is formed in a roof shape; and
an interspace between the top surface of said piston and a ridge region of said pent-roof-shaped ceiling wall is set to be greater than that between the top surface of said piston and the ceiling wall region surrounding said ridge region,
wherein said combustion chamber structure further comprising a second spark plug having a sparking end protruding from the ridge region of said pent-roof-shaped ceiling wall into said second combustion space.

7. The combustion chamber structure as defined in claim 6, further comprising an intake system provided with an intake valve and adapted to generate a swirl flow in said combustion chamber; and wherein the sparking end of said second spark plug is located immediately upstream of said intake valve in a direction of said swirl flow.

8. The combustion chamber structure as defined in claim 1, wherein said combustion chamber is designed as a pent-roof type in which said ceiling wall has an intake-side ceiling wall region and an exhaust-side ceiling wall region each formed in a roof shape; and
a part of said ceiling wall adjacent to the circumference of said cylinder bore is formed to be offset relative to a matching surface of said cylinder head with said cylinder block in a direction away from said cylinder block.

9. The combustion chamber structure as defined in claim 1, wherein said ceiling wall has a first region formed with an intake opening of an intake port adapted to generate a tumble flow, and a second region formed with an exhaust opening of an exhaust port; and
said piston has a crown formed with a first convex area between said first and second combustion spaces and on the side of a zone of a throat of said intake port which has a relatively high intake flow speed on the basis of an intake flow speed at a center of said intake opening in top plan view, said first convex area protruding from a first region of an upper surface of said crown at a height greater than that in a second region of the upper surface of said crown on the opposite side of said first region with respect to a center of said cylinder bore in top plan view,
wherein said intake port is adapted to allow the tumble flow generated from said throat to collide with said first convex area.

10. The combustion chamber structure as defined in claim 9, wherein the crown of said piston has a central region formed with a central concave area and adapted to allow a part of the tumble flow having no collision with said first convex area to flow in a direction opposed to a reverse tumble flow supplied from a zone of said throat having a relatively low intake flow speed.

11. The combustion chamber structure as defined in claim 9, wherein said intake port is designed as a normal-tumble flow generation port in which the zone of said throat having a relatively high intake flow speed is located on the side of said exhaust opening; and
said first convex area is located on the side of said exhaust opening relative to said spark plug in top plan view.

12. The combustion chamber structure as defined in claim 9, wherein the crown of said piston is formed with a convex portion including said first convex area and protruding annularly in top plan view, said convex portion further including a second convex area formed on the opposite side of said first convex area with respect to a central region of the upper surface of said crown to protrude at a height less than that of said first convex area, and
said second combustion space is defined to extend from an outer circumference of said convex portion to an outer circumference of said piston when said piston is at the top dead center.

13. The combustion chamber structure as defined in claim 9, wherein said ceiling wall is formed in a pent-roof shape;
said first convex area is formed to protrude from a position radially inward from an outer edge of said crown by a given distance; and
said first convex area is formed to have a top surface approximately parallel to a sloping region of said ceiling wall.

14. A new combustion chamber structure for a spark-ignition engine, comprising:
a combustion chamber defined between a bottom surface of a cylinder head and a top surface of a piston in such a manner that the bottom surface of said cylinder head serves as a ceiling wall thereof; and
a spark plug having a sparking end protruding from the ceiling wall into thecombustion chamber, wherein:
when said piston is at a top dead center, a principal space of the combustion chamber is parted into a first combustion space around the sparking end of side spark plug and a second combustion space around a circumference of a cylinder bore,
said ceiling wall and the top surface of said piston are configured such that a narrowed space is formed therebetween so that said narrowed space functions as a small interspace zone which communications between said first combustion space and said second combustion space;
said piston has a crown which is formed with a convex portion protruding toward said ceiling wall, and a concave portion concaved relative to said convex portion;
said small interspace zone is defined between said ceiling wall and a top surface of said convex portion; and each of said first combustion space and said second combustion space is defined between said concave portion and said ceiling wall;
said spark plug is located around a radial center of said cylinder bore;

said convex portion is formed in an annular shape approximately concentric with the circumference of said cylinder bore; and a protruding height of said convex portion in an exhaust-side region with respect to a prescribed point of said concave portion is greater than protruding height of said convex portion in an intake-side region with respect to said prescribed point of said concave portion.

* * * * *

UNITED STATES PATENT AND TRADEMARK OFFICE
CERTIFICATE OF CORRECTION

PATENT NO. : 7,360,531 B2  
APPLICATION NO. : 11/520700  
DATED : April 22, 2008  
INVENTOR(S) : Takashi Yohso et al.

Page 1 of 1

It is certified that error appears in the above-identified patent and that said Letters Patent is hereby corrected as shown below:

On the Title Page should read:

(73) Assignee: MAZDA MOTOR CORPORATION, Hiroshima (JP)

Signed and Sealed this

Thirtieth Day of December, 2008

JON W. DUDAS  
*Director of the United States Patent and Trademark Office*